United States Patent
Oe

(10) Patent No.: US 9,823,855 B2
(45) Date of Patent: Nov. 21, 2017

(54) STORAGE CONTROL DEVICE, STORAGE SYSTEM AND METHOD OF CONTROLLING A STORAGE SYSTEM

(71) Applicant: FUJITSU LIMITED, Kawasaki-shi, Kanagawa (JP)

(72) Inventor: Kazuichi Oe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 3 days.

(21) Appl. No.: 15/176,694

(22) Filed: Jun. 8, 2016

(65) Prior Publication Data

US 2016/0371016 A1     Dec. 22, 2016

(30) Foreign Application Priority Data

Jun. 19, 2015  (JP) ................................ 2015-123741

(51) Int. Cl.
*G06F 3/06* (2006.01)

(52) U.S. Cl.
CPC .......... *G06F 3/0611* (2013.01); *G06F 3/0647* (2013.01); *G06F 3/0685* (2013.01)

(58) Field of Classification Search
None
See application file for complete search history.

(56) References Cited

U.S. PATENT DOCUMENTS

| 9,665,288 | B1* | 5/2017 | Aharoni | G06F 3/061 |
| 2006/0259727 | A1* | 11/2006 | Thomas | G06F 3/0607 |
| | | | | 711/165 |
| 2008/0140908 | A1* | 6/2008 | Miyata | G06F 3/0611 |
| | | | | 711/100 |
| 2012/0317358 | A1* | 12/2012 | Ando | G06F 3/0605 |
| | | | | 711/117 |
| 2013/0219144 | A1 | 8/2013 | Oe et al. | |
| 2014/0244959 | A1 | 8/2014 | Oe et al. | |
| 2014/0297971 | A1 | 10/2014 | Oe et al. | |
| 2014/0325121 | A1* | 10/2014 | Akutsu | G06F 3/0604 |
| | | | | 711/103 |
| 2014/0351504 | A1 | 11/2014 | Kawaba et al. | |

(Continued)

FOREIGN PATENT DOCUMENTS

| JP | 9-214935 | 8/1997 |
| JP | 2013-171305 | 9/2013 |

(Continued)

*Primary Examiner* — Kaushikkumar Patel
(74) *Attorney, Agent, or Firm* — Staas & Halsey LLP

(57) ABSTRACT

A storage control device controlling a storage system including a first storage device and a second storage device, the first storage device and the second storage device include a plurality of regions for storing data, respectively, a data transmission between the first storage device and the second storage device is executed by the region, the storage control device includes a memory, and a processor coupled to the memory and configured to determine a first region of the first storage device as a first transmitting target region, the first region having a first size, transmit, from the first storage device to the second storage device, second data having a second size smaller than the first size, and based on a response performance of the storage system during the transmitting of the second data, transmit first data stored in the first region from the first storage device to the second storage device.

20 Claims, 22 Drawing Sheets

(56) References Cited

U.S. PATENT DOCUMENTS

| | | | | |
|---|---|---|---|---|
| 2015/0006832 A1* | 1/2015 | Bohling | ............... | G06F 3/0644 |
| | | | | 711/158 |
| 2015/0242142 A1* | 8/2015 | Inai | ...................... | G06F 3/0619 |
| | | | | 711/112 |
| 2017/0060633 A1* | 3/2017 | Suarez Gracia | ...... | G06F 9/5005 |

FOREIGN PATENT DOCUMENTS

| JP | 2014-164510 | 9/2014 |
|---|---|---|
| JP | 2014-191503 | 10/2014 |
| JP | 2014-229144 | 12/2014 |

* cited by examiner

| SEGMENT | NUMBER OF IO'S | TIME STAMP |
|---------|----------------|------------|
| 0 | 1000 | 1 |
| 1 | 1200 | 3 |
| ⋮ | ⋮ | ⋮ |

| SSD OFFSET | HDD OFFSET | STATE |
|---|---|---|
| 0 | 268435456 | ALLOCATED |
| 2097152 | 306184192 | MOVING (HDD→SSD) |
| 4194304 | 505413632 | MOVING (SSD→HDD) |
| 6291456 | NULL | FREE |
| ⋮ | ⋮ | ⋮ |

| SEGMENT | TIME STAMP |
|---|---|
| 10 | xxxxxx...x |
| 20 | yyyyyy...y |
| : | : |

FIG. 10

| SSD CONSUMPTION (GB) | 106 | 99 | 90 | 75 | 66 |
|---|---|---|---|---|---|
| USER IO THRESHOLD (ms) | 80 | 100 | 150 | 200 | 250 |
| RESPONSE TIME (ms) IN PROACTIVE AND OBSERVATIONAL CONTROL PROCESSING | 16.8 | 18.3 | 21.5 | 25.8 | 29.5 |
| RESPONSE TIME (ms) IN FACEBOOK FLASHCACHE | 23.8 | 26.7 | 25.3 | 26.5 | 25.1 |

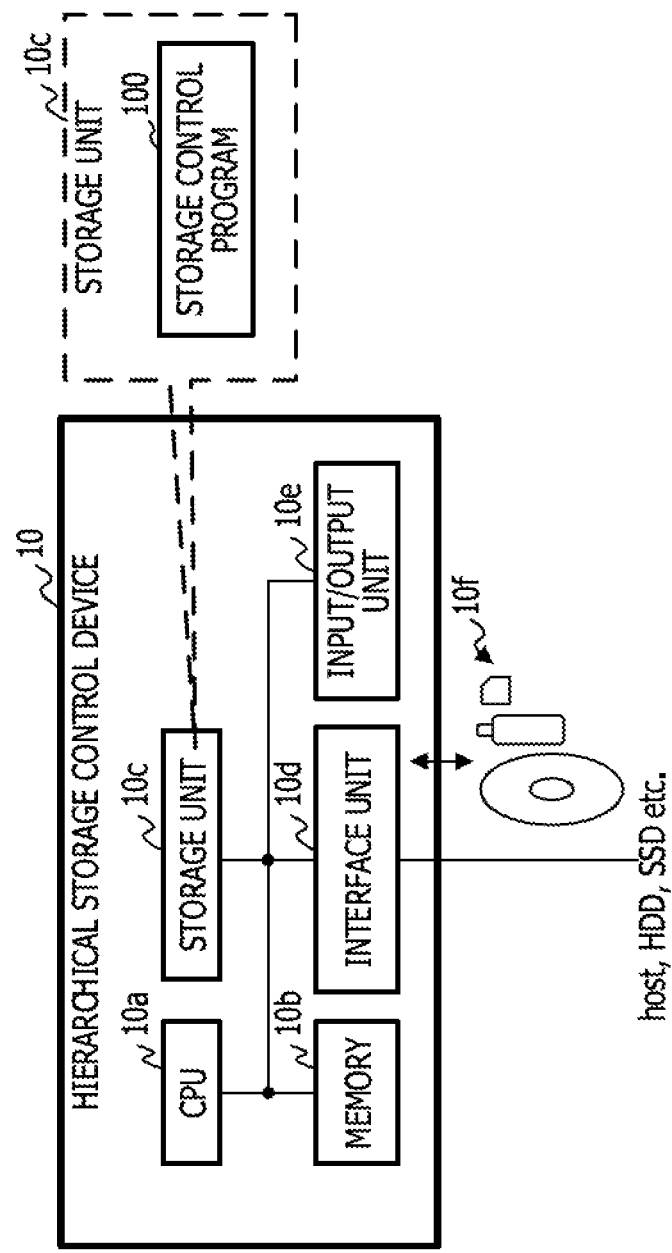

STORAGE CONTROL DEVICE, STORAGE SYSTEM AND METHOD OF CONTROLLING A STORAGE SYSTEM

CROSS-REFERENCE TO RELATED APPLICATION

This application is based upon and claims the benefit of priority of the prior Japanese Patent Application No. 2015-123741, filed on Jun. 19, 2015, the entire contents of which are incorporated herein by reference.

FIELD

The embodiment discussed herein is related to a storage control device, a storage system and a method of controlling a storage system.

BACKGROUND

A hierarchical storage system in which a plurality of storage mediums (storage devices) are used in combination with each other is sometimes used as a storage system that stores data. As the plurality of storage mediums, solid state drives (SSD's), which are capable of high-speed access but have a comparatively small capacity and a high cost, and hard disk drives (HDD's), which have a comparatively large capacity and a low cost but a comparatively low speed, may be used.

In a hierarchical storage system, it is possible to increase the use efficiency of the SSD's and increase the performance of the entire system, by arranging data of a storage region having a low access frequency in a HDD and arranging data of a storage region having a high access frequency in an SSD. Therefore, in order to improve the performance of a hierarchical storage system, it is preferable to efficiently arrange data of a region having a high access frequency in an SSD.

As an example of a method of arranging data having a high access frequency in an SSD, a method is known in which regions having a high access frequency are arranged in an SSD in units of 1 day in accordance with the access frequency of the preceding day, for example.

However, in a pattern of access to a storage system used in file sharing etc., input/output (IO) requests (hereafter may be simply referred to as IO's) may be concentrated in a narrow range in the storage region in comparatively short period of time of around several minutes to several tens of minutes and then the IO's may move to another region as time passes. For such a workload, it is often the case that the workload may not be tracked by totaling the access frequencies for a long period of, for example, 1 day. "Workload" is an index that represents the distribution of accesses to a storage device (usage state of storage device) and the workload changes with the passing of time and an offset position (storage region) of the storage device.

As an example of a technique for handling a workload where the load moves in a short period of time, a technique is known in which the occurrence of IO concentration is monitored and whenever IO concentration occurs, the region in which the IO concentration has occurred is moved from a HDD to an SSD. In this technique, the region that was moved to the SDD is moved back to the HDD once the IO concentration has ended, the SSD region is freed up, and consequently a region where IO concentration next occurs can be quickly moved to the SSD. In addition, a technique is also known in which a region obtained by linking together the regions in the vicinity of a high load region is determined to be a movement target region at this time.

As examples of the related art, Japanese Laid-open Patent Publication No. 2014-164510, Japanese Laid-open Patent Publication No. 2014-191503, Japanese Laid-open Patent Publication No. 2014-229144, Japanese Laid-open Patent Publication No. 2013-171305 and Japanese Laid-open Patent Publication No. 9-214935 are known.

SUMMARY

According to an aspect of the invention, a storage control device configured to control a storage system including a first storage device and a second storage device, the first storage device and the second storage device including a plurality of regions for storing data, respectively, a data transmission between the first storage device and the second storage device being executed by the region, the storage control device includes a memory, and a processor coupled to the memory and configured to determine a first region included in the plurality of regions of the first storage device as a first transmitting target region, the first region having a first size, transmit, from the first storage device to the second storage device, second data in the first storage device and having a second size smaller than the first size, and based on a response performance of the storage system during the transmitting of the second data, transmit first data stored in the first region from the first storage device to the second storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of the data structure of an IODB;

FIG. 4 illustrates an example of the data structure of a hierarchy table;

FIG. 8 illustrates the data structure of predicted segments;

FIG. 10 illustrates examples of the relationship between the SSD consumption and the average response time in dynamic hierarchical control according to an embodiment for predetermined thresholds;

FIG. 22 illustrates an example hardware configuration of the hierarchical storage control device illustrated in FIG. 1.

DESCRIPTION OF EMBODIMENT

Figure 1:
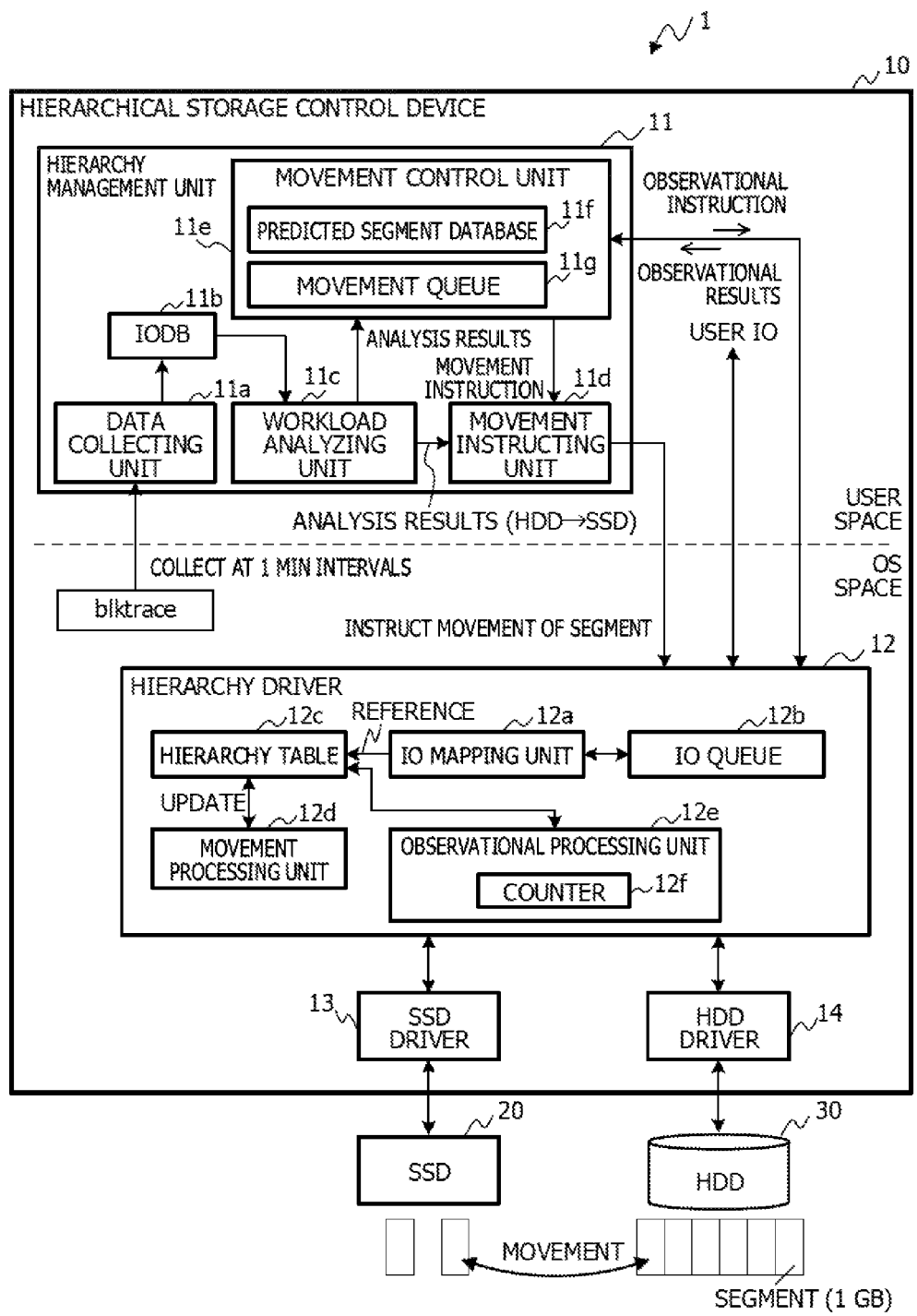
FIG. 1 illustrates an example configuration of a hierarchical storage system as an example embodiment.

In the above-described techniques, since data is moved between the HDD and SDD while user IO's occur, there is a risk that the user IO response during such movement will be degraded.

Hereafter, an embodiment will be described while referring to the drawings. However, the embodiment described hereafter is merely an illustrative example and is not intended to exclude various modifications and technical applications not illustrated hereafter. That is, this embodiment can be modified in various ways within the scope of the gist thereof. In the drawings used in the following embodiment, parts that are denoted by the same symbols represent identical or similar parts unless otherwise noted.

(1) Embodiment (1-1) Example Configuration of Hierarchical Storage System

FIG. 1 illustrates an example configuration of a hierarchical storage system 1 as an example embodiment. As illustrated in FIG. 1, as an illustrative example, the hierarchical storage system 1 includes a hierarchical storage control device 10, at least one (one in FIG. 1) SSD 20 and at least one (one in FIG. 1) HDD 30.

The hierarchical storage system 1 is an example of a storage apparatus that includes a plurality of storage devices. A plurality of storage devices that have different performances from each other such as the SSD 20 and the HDD 30 are mounted in the hierarchical storage system 1 and the hierarchical storage system 1 provides the storage regions of the storage devices in the form of a hierarchy for a host device, which is not illustrated. As an example, the hierarchical storage system 1 saves data in a distributed or redundant state in the plurality of storage devices by using redundant arrays of inexpensive disks (RAID's) and provides the host device with at least one storage volume (logical unit number (LUN)) based on a RAID group.

The hierarchical storage control device 10 performs a variety of access operations such as read and write to the SSD 20 and the HDD 30 in accordance with user IO's from the host device or the like via a network. The hierarchical storage control device 10 may be an information processing device (computer) such as a personal computer (PC), a server or a controller module (CM).

In addition, the hierarchical storage control device 10 according to the embodiment performs dynamic hierarchical control to arrange a region having low access frequency in the HDD 30 and to arrange a region having high access frequency in the SSD 20 in accordance with the user IO access frequencies. Thus, the hierarchical storage control device 10 is an example of a storage control device that controls movement of data between a plurality of storage devices.

The hierarchical storage control device 10 may use a device-mapper function, which is a module (program) implemented in Linux (registered trademark). For example, in dynamic hierarchical control, the hierarchical storage control device 10 can monitor a storage volume in units of segments (sub LUN's) by using the device-mapper and move data of a segment for which the load is high from the HDD 30 to the SSD 20 in order to handle IO's to a high-load segment.

Here, a "segment" is a region obtained by dividing a storage volume into pieces of a predetermined size and is a region that is the smallest unit (unit region) of hierarchical movement in dynamic hierarchical control. For example, a segment may have a size of around 1 gigabyte (GB).

The SSD 20 is an example of a storage device that stores a variety of data, programs and so forth and the HDD 30 is an example of a storage device that has a different performance (for example, lower speed) to the SSD 20. In this embodiment, a semiconductor drive device such as the SSD 20 and a magnetic disk device such as the HDD 30 are given as examples of the different storage devices (hereafter, may be referred to as first and second storage devices for the sake of convenience) but the different storage devices are not limited to these storage devices. Various storage devices having a difference in performance such as a difference in read/write speed may be used as the first and second storage devices.

The SSD 20 and the HDD 30 each include storage regions that can store data of segments in a storage volume and the hierarchical storage control device 10 controls the movement of such regions between the SSD 20 and the HDD 30 in units of segments.

In the example of FIG. 1, it is assumed that the hierarchical storage system 1 includes a single SSD 20 and a single HDD 30, but the hierarchical storage system 1 is not limited to this and may include a plurality of SSD's 20 and a plurality of HDD's 30.

(1-2) Example of Functional Configuration of Hierarchical Storage Control Device An example of the functional configuration of the hierarchical storage control device 10 will be described.

As illustrated in FIG. 1, the hierarchical storage control device 10 includes a hierarchy management unit 11, a hierarchy driver 12, an SSD driver 13 and a HDD driver 14, for example. The hierarchy management unit 11 may be implemented as a program that is executed in a user space, and the hierarchy driver 12, the SSD driver 13 and the HDD driver 14 may be implemented as programs that are executed in an operating system (OS) space.

The hierarchy management unit 11 determines a segment for which region movement is to be performed based on IO information traced for the storage volume and instructs the hierarchy driver 12 to move the data of the determined segment. As the IO trace, blktrace may be used, which is a command that traces IO's at a block IO level. iostat, which is a command that checks the usage state of disk IO's, may be used instead of blktrace. blktrace and iostat are executed in OS space.

The hierarchy management unit 11 includes a data collecting unit 11a, an IO database (DB) 11b, a workload analyzing unit 11c, a movement instructing unit 11d and a movement control unit 11e.

The data collecting unit 11a collects and sums together IO information traced using blktrace at predetermined intervals (for example, intervals of 1 minute) and stores the result of the summing along with a time stamp in the IODB 11b.

The summing of the IO information performed by the data collecting unit 11a may include, for example, information specifying the segments and summing the number of IO's for each segment based on the collected IO information.

The IODB 11b is a database that stores the information regarding the number of IO's for each segment summed by the data collecting unit 11a and is, for example, implemented using a memory or the like, which is not illustrated.

FIG. 2 illustrates an example of the IODB 11b illustrated in FIG. 1. As illustrated in FIG. 2, the IODB 11b may handle and store information specifying the segment, the number of IO's and the time stamp for each segment. As an example, a total number of IO's of "1000" and a time stamp of "1" are set for the segment "0" in the IODB 11b.

As the information specifying the segment, a segment number (identifier (ID)) is used, but the beginning offset in the storage volume may be used instead. The number of IO's is the total number of IO's performed to the segment in 1 minute (IO's per minute (iopm)). The time stamp is an identifier that identifies the time and may be set as the time, for example.

The workload analyzing unit 11c selects a segment whose data is to be moved to the SSD 20 or the HDD 30 from among the segments stored in the IODB 11b and notifies the movement instructing unit 11d or the movement control unit 11e of information regarding the selected segment.

As an example, the workload analyzing unit 11c extracts the segments in descending order of the number of IO's as segments whose data is to be moved to the SSD 20 until the number of extracted segments reaches the maximum number of segments (predetermined number) for which hierarchical movement is to simultaneously performed.

The extraction of segments performed by the workload analyzing unit 11c may include extraction of segments for which the number of IO's or the access concentration ratio (ratio of number of IO's to total number of IO's) is higher than a predetermined threshold. In addition, the extraction of segments may include extraction of segments on the SSD 20 for which, for example, the number of IO's is greater than the predetermined number or for which the number of IO's or the access concentration ratio is equal to or less than a predetermined threshold, as segments whose data is to be moved to the HDD 30.

In addition, the extraction of segments may include extraction of segments, as segments whose data is to be moved to the SSD 20 or the HDD 30, when the segments continually satisfy, a predetermined number of times or more, extraction conditions for segments whose data is to be moved to the SSD 20 or the HDD 30. Furthermore, other than based on the number of IO's, the segments may be selected based on a read/write ratio (rw ratio).

Here, the workload analyzing unit 11c instructs the movement instructing unit 11d to hierarchically move a segment inside the HDD 30 to the SSD 20, and then instructs the movement control unit 11e to hierarchically move another segment inside the SSD 20 to the HDD 30. On the other hand, in the case where the workload analyzing unit 11c predicts that the load to a certain segment will decrease while the certain segment is being hierarchically moved to the SSD 20, the workload analyzing unit 11c may suppress hierarchical movement of the certain segment to the HDD 30 and instruct hierarchical movement of another segment to the HDD 30.

For example, the workload analyzing unit 11c determines whether the load to a segment during hierarchical movement will decrease based on the average life expectancy of a spike and the time taken to perform the hierarchical movement. "Spike" refers to the concentration of load at certain segments and "average life expectancy" is a time obtained by subtracting an execution time that has already elapsed from the duration of the continuing load and is a value determined in accordance with the workload. A manager, for example, may obtain the average life expectancy in advance and set the average life expectancy in the hierarchical storage control device 10.

Specifically, the workload analyzing unit 11c extracts a segment whose data is to be moved to the SSD 20 and calculates the cost (time) of moving the data of the extracted segment to the SSD 20. The workload analyzing unit 11c determines to perform hierarchical movement from the SSD 20 to the HDD 30 without performing hierarchical movement from the HDD 30 to the SSD 20 when the average life expectancy is equal to or less than the time the movement would take.

Although this processing of the workload analyzing unit 11c may be performed at a predetermined timing, there are also cases where extraction and notification of a segment to be moved from the HDD 30 to the SSD 20 or of a segment to be moved from the SSD 20 to the HDD 30 are not performed periodically. In such as case, the workload analyzing unit 11c does not have to notify the movement control unit 11e or may notify the movement control unit 11e that a segment has not been selected. In addition the predetermined timing may be a timing that falls at predetermined periods such as every 1 minute, for example.

Thus, the workload analyzing unit 11c is an example of a determining unit that determines a movement target unit region from which first data is to be moved to the HDD 30 from among a plurality of segments obtained by dividing the storage region of the SSD 20 into pieces of a first size. In addition, the workload analyzing unit 11c serving as a determining unit determines segments that are to be movement targets to be moved from the HDD 30 to the SSD 20 based on the number of IO's to each segment in the HDD 30 at a predetermined timing and instructs the movement instructing unit 11d to move the determined segments.

The movement instructing unit 11d instructs the hierarchy driver 12 to move the data of the selected segments from the HDD 30 to the SSD 20 or from the SSD 20 to the HDD 30 based on the instruction from the workload analyzing unit 11c or the movement control unit 11e.

The instruction of movement performed by the movement instructing unit 11d may include converting an offset, on the storage volume, of the selected segment into an offset on the HDD 30 and instructing movement of data for each segment. For example, in the case where the sector size of the HDD 30 is 512 B, the offset on the HDD 30 would be 1×1024×1024×1024/512=2097152 if the volume offset were 1 GB.

The movement control unit 11e performs the following control in order to suppress degradation of the IO response when user IO's occur during hierarchical movement of each segment based on the number of IO's, as described above. The movement control unit 11e includes a predicted segment DB 11f and a movement queue 11g, for example.

Figure 3:
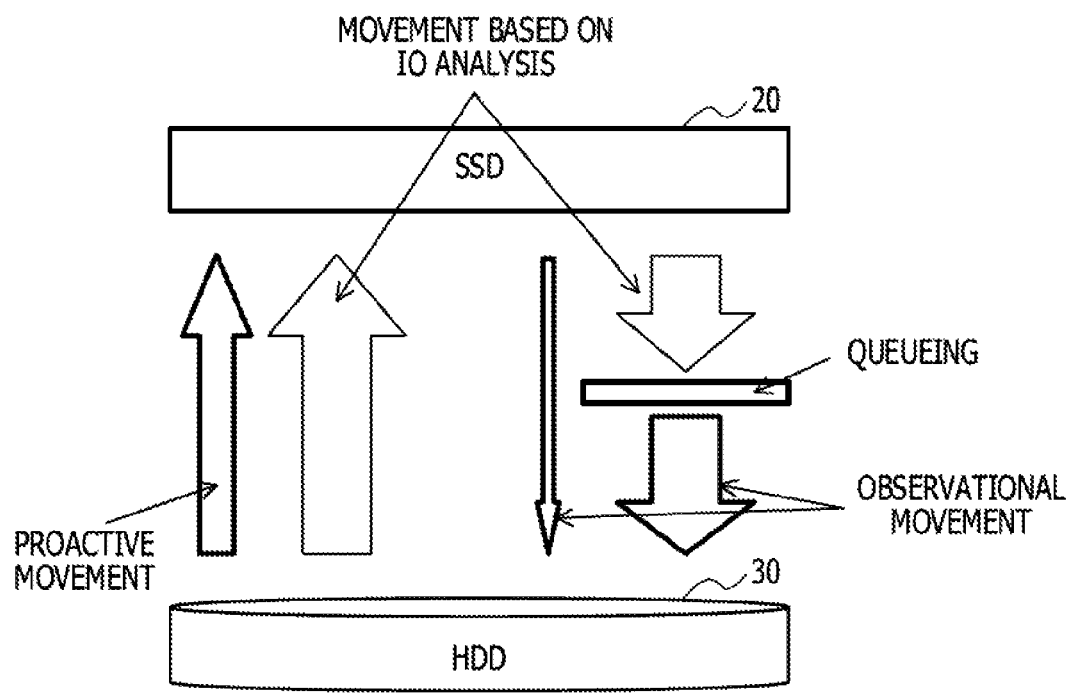
FIG. 3 is a diagram for explaining an example of control performed by a movement control unit.

FIG. 3 is a diagram for explaining an example of control performed by the movement control unit 11e. As indicated by the arrows "movement based on IO analysis" in FIG. 3, hierarchical movement between the SSD 20 and the HDD 30 is performed in accordance with analysis of the numbers of IO's performed by the workload analyzing unit 11c. The movement control unit 11e performs proactive movement control processing and observational movement control processing in addition to the movement based on IO analysis.

In the proactive movement control, in addition to the movement from the HDD 30 to the SSD 20 based on IO analysis, segments where IO concentration will occur (number of IO's increases) in the near future are predicted and these segments are moved to the SSD 20 before the IO concentration occurs. With the proactive movement control, since the data of the segments is moved to the SSD 20 before IO concentration occurs, the effect on user IO's can be reduced compared with the case where the data of segments where IO's are concentrated is moved based on analysis of the number of IO's.

In the observational movement control, hierarchical movement is executed with a size that is sufficiently smaller than the segment size prior to the execution of movement from the SSD 20 to the HDD 30 based on IO analysis, a timing at which the load of the HDD 30 is low is detected and movement based on IO analysis is then performed at the detected timing. With the observational movement control, the effect on user IO's can be reduced compared with the case where movement is executed immediately after determining the segments that are to be movement targets based on IO analysis.

The details of the proactive movement control and the observational movement control will be described below.

The hierarchy driver 12 includes an IO mapping unit 12a, an IO queue 12b, a hierarchy table 12c, a movement processing unit 12d and an observational processing unit 12e, for example.

The IO mapping unit 12a processes IO requests made to a storage volume from the host device. For example, the IO mapping unit 12a performs processing to allocate an IO request to the SSD driver 13 or the HDD driver 14 by using the hierarchy table 12c and return an IO response from the SSD driver 13 or the HDD driver 14 to the host device.

The IO queue 12b is a storage region having a first-in first-out (FIFO) structure that temporarily stores IO requests and is implemented using a memory or the like, which is not illustrated.

An example, when an IO request is issued for a segment that is undergoing hierarchical movement, the IO mapping unit 12a stores the IO request in the IO queue 12b and withholds the IO request until the movement of the data of the segment is complete. Once the movement of the data is complete, the IO mapping unit 12a reads the IO request from the IO queue 12b and resumes allocation of the IO request to the SSD driver 13 or the HDD driver 14.

The hierarchy table 12c is a table that is used in allocation of IO requests performed by the IO mapping unit 12a and in hierarchy control performed by the movement processing unit 12d and so forth, and is implemented using a memory or the like, which is not illustrated.

An example of the data structure of the hierarchy table 12c is illustrated in FIG. 4. As illustrated in FIG. 4, the hierarchy table 12c stores an SSD offset, a HDD offset and a state in association with each other for each segment whose data has been moved to the SSD 20.

The SSD offset indicates the offset, in the SSD 20, of a segment whose data has been moved to the SSD 20. The SSD offset is a fixed value that is obtained by taking an offset of "2097152", which corresponds to the segment size (for example 1 GB) of the volume, as a unit value and takes values of "0", "2097152", "4194304", "6291456" and so on, for example.

The HDD offset indicates the offset, in the HDD 30, of a segment whose data has been moved to the SSD 20. A value of "NULL" for the HDD offset indicates that the region of the SSD 20 specified by the SSD offset is unused.

The state indicates the state of a segment and may be "allocated", "Moving (HDD→SSD)", "Moving (SSD→HDD)" or "free". "allocated" indicates that the segment has been allocated to the SSD 20 and "Moving (HDD→SSD) indicates that the data of the segment is being transferred from the HDD 30 to the SSD 20. "Moving (SSD→HDD)" indicates that the data of the segment is being transferred from the SSD 20 to the HDD 30, and "free" indicates that the region of the SSD 20 specified by the SSD offset is unused.

The IO mapping unit 12a determines whether to allocate an IO request to the SSD driver 13 or the HDD driver 14 by referring to the above-described hierarchy table 12c and determines whether the IO request relates to a segment that being moved.

Upon receiving a segment movement instruction from the movement instructing unit 11d, the movement processing unit 12d executes movement processing to move data that is stored in the movement target unit region of the HDD 30 or the SSD 20 to the SSD 20 or the HDD 30. At this time, the movement processing unit 12d refers to the hierarchy table 12c and moves the data of the segment specified by the segment movement instruction between the SSD 20 and the HDD 30.

More specifically, upon receiving a segment movement instruction, the movement processing unit 12d searches for an entry that is "NULL" according the HDD offset in the hierarchy table 12c and registers therein the HDD offset information and the state specified in the segment movement instruction. The state registered at this time is "Moving (HDD→SSD)" or "Moving (SSD→HDD)". Then, the movement processing unit 12d issues a data transfer instruction to kcopyd to transfer the data between the SSD 20 and the HDD 30.

In addition, once the transfer of the data inside all the regions is completed by kcopyd, the movement processing unit 12d searches for entries for which the transfer is complete in the hierarchy table 12c and changes the states of the entries to "allocated" in the case where the state is "Moving (HDD→SSD)". On the other hand, the movement processing unit 12d changes the states of the entries to "free" in the case where the state is "Moving (SSD→HDD)" and sets the corresponding HDD offset to "NULL".

kcopyd is a module (program) that is implemented in device-mapper and executes copying of data between devices, and is executed in OS space.

Thus, the movement instructing unit 11d and the movement processing unit 12d form an example of a movement unit that moves data stored in a region specified in an instruction from the workload analyzing unit 11c or the movement control unit 11e between the SSD 20 and the HDD 30 for each segment.

The observational processing unit 12e performs hierarchical movement of a size sufficiently smaller than the segment size from the SSD 20 to the HDD 30 in accordance with a movement instruction (observational movement instruction) from the movement control unit 11e and observes the user IO response at that time.

The observational processing unit 12e will be described in detail below.

The SSD driver 13 controls access to the SSD 20 based on instructions from the hierarchy driver 12. The HDD driver 14 controls access to the HDD 30 based on instructions from the hierarchy driver 12.

(1-3) Description of Proactive Movement Control and Observational Movement Control Next, the proactive movement control and the observational movement control will be described in detail.

(Proactive Movement Control)

First, the proactive movement control will be described in detail while referring to FIGS. 5 to 8.

When the storage workload of part of a file system in which software such as samba is installed is analyzed, it is clear that at least half of the total number of IO's occur in around 10 to 50 minutes in a region that is less than several percent of the total storage capacity and that the IO's then move to other regions.

Figure 5:
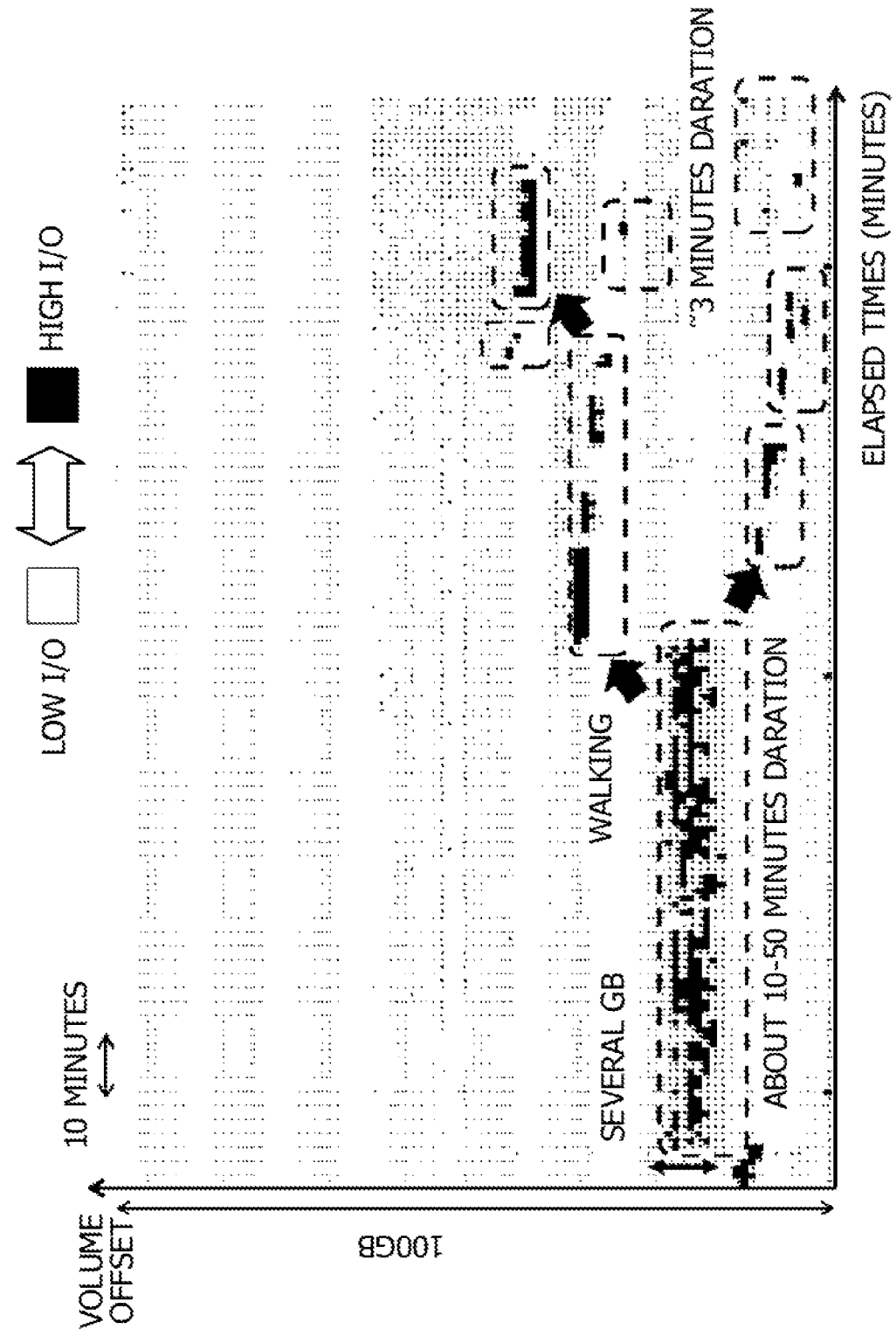
FIGS. 5 and 6 illustrate examples of analysis of workload.

FIG. 5 illustrates an example of analysis of the storage workload for a system with a total capacity of 4.4 TB. As illustrated in FIG. 5, it is clear that at least half of the total number of IO's are concentrated for around 10 to 50 minutes in a region of several GB's and that this concentration of IO's then moves to other regions (volume offsets, logical block addresses (LBA's)).

With the IO analysis including the workload analyzing unit 11c described above, the performance can be improved by extracting a segment where IO concentration occurs whenever IO concentration occurs as illustrated in FIG. 5 and moving the segment to a high-speed storage such as the SSD 20.

Figure 6:
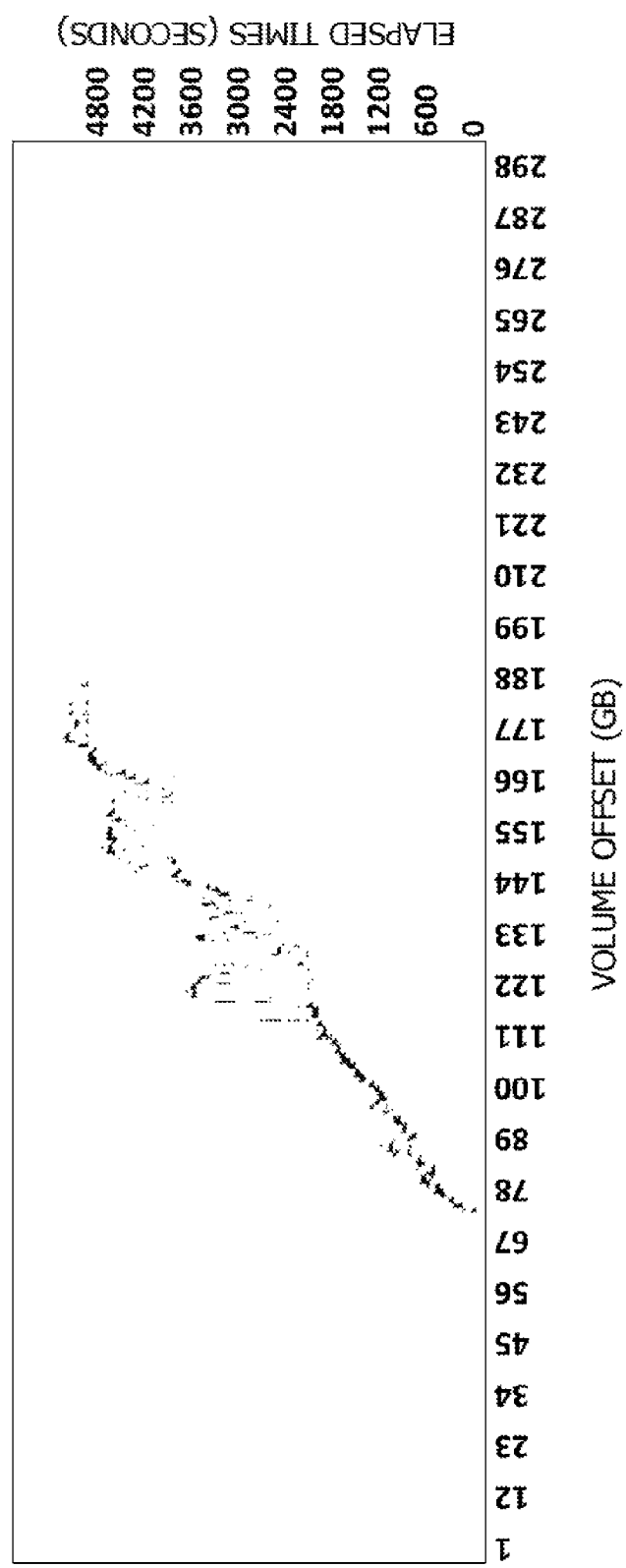

FIG. 6 illustrates an example of analysis of a storage workload that is different to that in FIG. 5. FIG. 6 indicates a relation between locations of the LBA's where IO concentration occurs and time. From FIG. 6, it can be seen that the LBA's where IO concentration occurs move as time passes. In addition, it is clear that the speed at which the LBA's move is substantially fixed.

Accordingly, in the proactive movement control, focusing on the fact that the region where the number of IO's increases (IO's become concentrated) moves (transitions) with time, the region to which IO concentration will move in the near future is obtained based on the transition speed of the region and the obtained region is moved to the SSD 20 before IO concentration occurs in that region.

At this time, if movement of data based on IO analysis and movement of data based on proactive movement control are performed at the same time, there is actually a possibility that the user IO response will be degraded. Accordingly, degradation of the IO response can be avoided by performing proactive movement control at a timing when data is not being moved based on IO analysis.

Next, an example of the processing procedure of the proactive movement control performed by the movement control unit 11e will be described while referring to FIG. 7. As illustrated by (i) of FIG. 7, in the proactive movement control, the movement control unit 11e predicts a segment that is to be preloaded and stores the segment ID of this predicted segment and the current time in the predicted segment DB 11f (refer to FIG. 1).

The processing of (i) may be executed when information (for example, segment ID) regarding the segment selected (instructed) as a movement target to be moved from the HDD 30 to the SSD 20 by the IO analysis is received from the workload analyzing unit 11c. At this time, the movement control unit 11e determines a value obtained by adding a preload width N to the segment specified in an instruction from the workload analyzing unit 11c to obtain a predicted (proactive) segment.

The preload width (movement width) N is a value that defines how many segments a segment that is to be preloaded in advance is after the segment specified in the instruction and can be obtained from the transition speed of the segment where the IO's are concentrated. For example, in the case where a segment where IO's will occur a predicted time t minutes later is to be read from the HDD 30 into the SSD 20 in advance, the movement width N is calculated by multiplying the transition speed, for example, the movement speed K in terms of the offset, by the predicted time t.

The segment movement speed K (or movement width N) may be obtained and set in advance in the hierarchy management unit 11 based on workload analysis performed in advance by the manager or the like of the hierarchical storage system 1 or may be calculated by the hierarchy management unit 11.

In the case where the hierarchy management unit 11 calculates the movement speed K, for example, the movement control unit 11e obtains the movement speed of a segment where the number of IO's increases in a storage region of the HDD 30 based on a plurality of segments determined by the workload analyzing unit 11c at a plurality of timings.

As an example, the movement control unit 11e calculates the movement speed K by obtaining a gradient from the difference between the segment currently specified in an instruction from the workload analyzing unit 11c and the present time and the segment specified in an instruction the previous time and the time at that time. For example, in the case where the segment ID's are numbered in ascending order of LBA or in the case where the segment ID's are the beginning offsets of the segments, the movement control unit 11e can obtain the movement speed K by calculating (current segment ID−previous segment ID/current time−previous time).

The movement speed K may be obtained based on the segments specified in instructions the current time and the previous time as described above, or the movement speed may be obtained through approximation by considering a segment specified in an instruction at a timing the time before last or a time prior to that.

Once the movement control unit 11e has calculated the predicted segment through the above-described processing, the movement control unit 11e stores the calculated predicted segment in the predicted segment DB 11f along with a time stamp.

The predicted segment DB 11f stores information relating to the predicted segment predicted by the movement control unit 11e and is implemented using a memory or the like, which is not illustrated.

An example of the data structure of the predicted segment DB 11f is illustrated in FIG. 8. The predicted segment DB 11f stores information specifying the segment and a time stamp, for example. The information specifying the segment may be, for example, the segment ID, similarly to as in the IODB 11*b*, or may be, for example, the beginning offset of the segment. The time stamp is an identifier that identifies the time and is set as the time, for example. As an example, "xxxxxx . . . x" is set as the time (time stamp) in the predicted segment DB 11*f* when the segment "10" is predicted.

Thus, the movement control unit 11*e* is an example of a prediction unit that predicts a segment (predicted segment) where the number of IO's will increase a predetermined period of time later based on a segment determined by the workload analyzing unit 11*c*.

Figure 7:
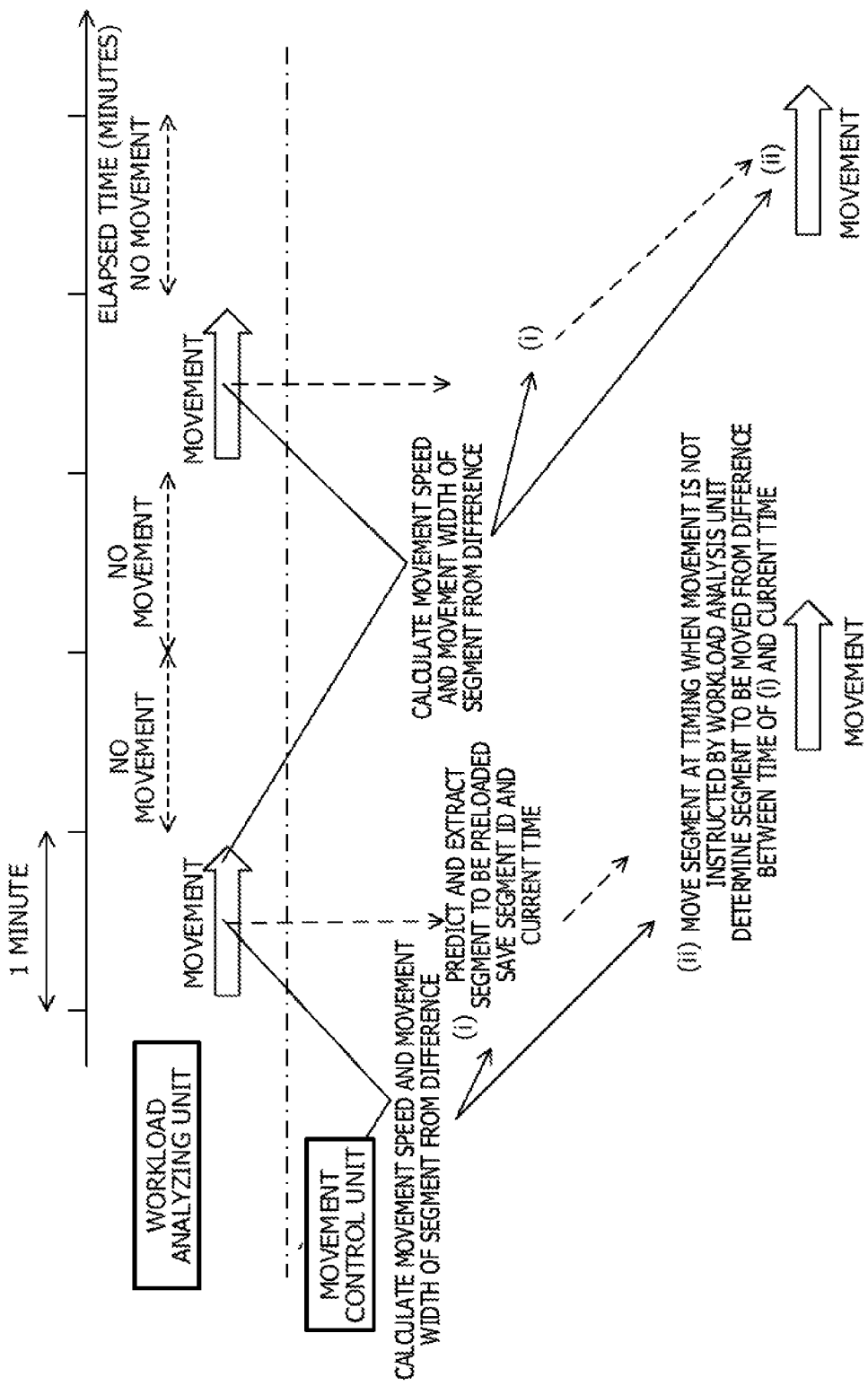
FIG. 7 is a diagram for explaining an example of the processing procedure of proactive movement control performed by a movement control unit.

Furthermore, as illustrated by (ii) in FIG. 7, in the proactive movement control, the movement control unit 11*e* instructs the movement instructing unit 11*d* to move the segment at a timing when no movement is instructed by the workload analyzing unit 11*c*.

In the processing of (ii), the movement control unit 11*e* retrieves information regarding the segment (predicted segment) from the predicted segment DB 11*f*, performs correction based on the current time and the movement speed K, and then issues an instruction to move the corrected segment.

Here, the predicted segment stored in the predicted segment DB 11*f* is a segment where it is predicted that IO's will become concentrated t minutes after the time when the processing of (i) is performed (time stamp) and is a segment that is suitable for preloading at the time when the processing of (i) is performed.

Therefore, the movement control unit 11*e* performs correction to make the predicted segment be a segment that is suitable for preloading at the current time and calculates a corrected segment at which it is predicted that IO's will concentrate t minutes after the present time.

For example, the movement control unit 11*e* reflects the advancement (movement) of the segment from the time when the processing of (i) was performed up until the present time in the predicted segment retrieved from the predicted segment DB 11*f*, and as a result obtains a segment where IO's will become concentrated t minutes after the present time.

As an example, the movement control unit 11*e* multiplies the difference between the time stamp retrieved from the predicted segment DB 11*f* (time when processing of (i) was performed) and the present time by the movement speed K to obtain the number of segments (or amount of offset) advanced (moved) through during the period of this difference. Then, the movement control unit 11*e* adds the segment retrieved from the predicted segment DB 11*f* and the obtained number of segments to each other to obtain the corrected segment.

As described above, if movement of data based on IO analysis and movement of data based on proactive movement control are performed at the same time, there is actually a possibility that the user IO response will be degraded. In the workload analyzing unit 11*c*, a segment is selected to be moved in a predetermined period such as a 1 minute interval as described above. However, there is also a situation in which a segment to be moved is not selected such as in the periods indicated by the broken-line arrows with the label "NO MOVEMENT" in the processing of the workload analyzing unit 11*c* of FIG. 7 in the case where there is no change in the segment where IO's are concentrated since the immediately preceding period.

Accordingly, the movement control unit 11*e* performs the above processing of (ii) in the periods in which there is no instruction to move a segment issued from the workload analyzing unit 11*c* (no notification is given of information regarding a segment or notification is given that segment has not been selected).

Thus, the movement control unit 11*e* is an example of an instructing unit that instructs the movement instructing unit 11*d* to move a segment based on the predicted segment at a timing where the workload analyzing unit 11*c* does not instruct the movement instructing unit 11*d* to move a segment.

As described above, according to the proactive movement control performed by the movement control unit 11*e*, a segment where it is expected that IO's will become concentrated in the near future can be moved in advance to the SSD 20, which has excellent performance, from the HDD 30. Therefore, degradation of the user IO response during movement of segments from the HDD 30 to the SSD 20 can be suppressed.

(Observational Movement Control)

Next, the observational movement control will be described while referring to FIGS. 9 to 12.

In the observational movement control, in contrast to the proactive movement control, degradation of the user IO response during movement of segments from the SSD 20 to the HDD 30 can be suppressed.

In dynamic hierarchical movement, segments are used as the smallest units of movement, as described above. A segment is a comparatively large unit on the order of 1 GB and therefore when hierarchical movement is performed when the load of the HDD 30 is high, there is a possibility that the response to a large number of user IO's will be degraded.

Accordingly, in the observational movement control, observational movement is executed between free regions of the SSD 20 and the HDD 30 at a size that is sufficiently smaller than the segment size (hereafter, referred to as observational movement size) and provided that the user IO response at this time does not deteriorate, proper (instructed) movement can be continuously executed.

It is sufficient that, for example, a size of 200 MB (⅕ the segment size) or less, or more preferable a size of around 50 MB (1/20 the segment size) be used as the observational movement size in the case where the segment size is 1 GB.

However, if the observational movement size is too small, there is a possibility that the movement will be completed before a load is generated in the HDD 30 and observation of the user IO response will not be correctly performed. Therefore, it is preferable that the observational movement size be determined so as to be within such a range as to allow a load to be generated in the HDD 30 and so as to not greatly affect the user IO response of the entire hierarchical storage system 1.

Figure 9:
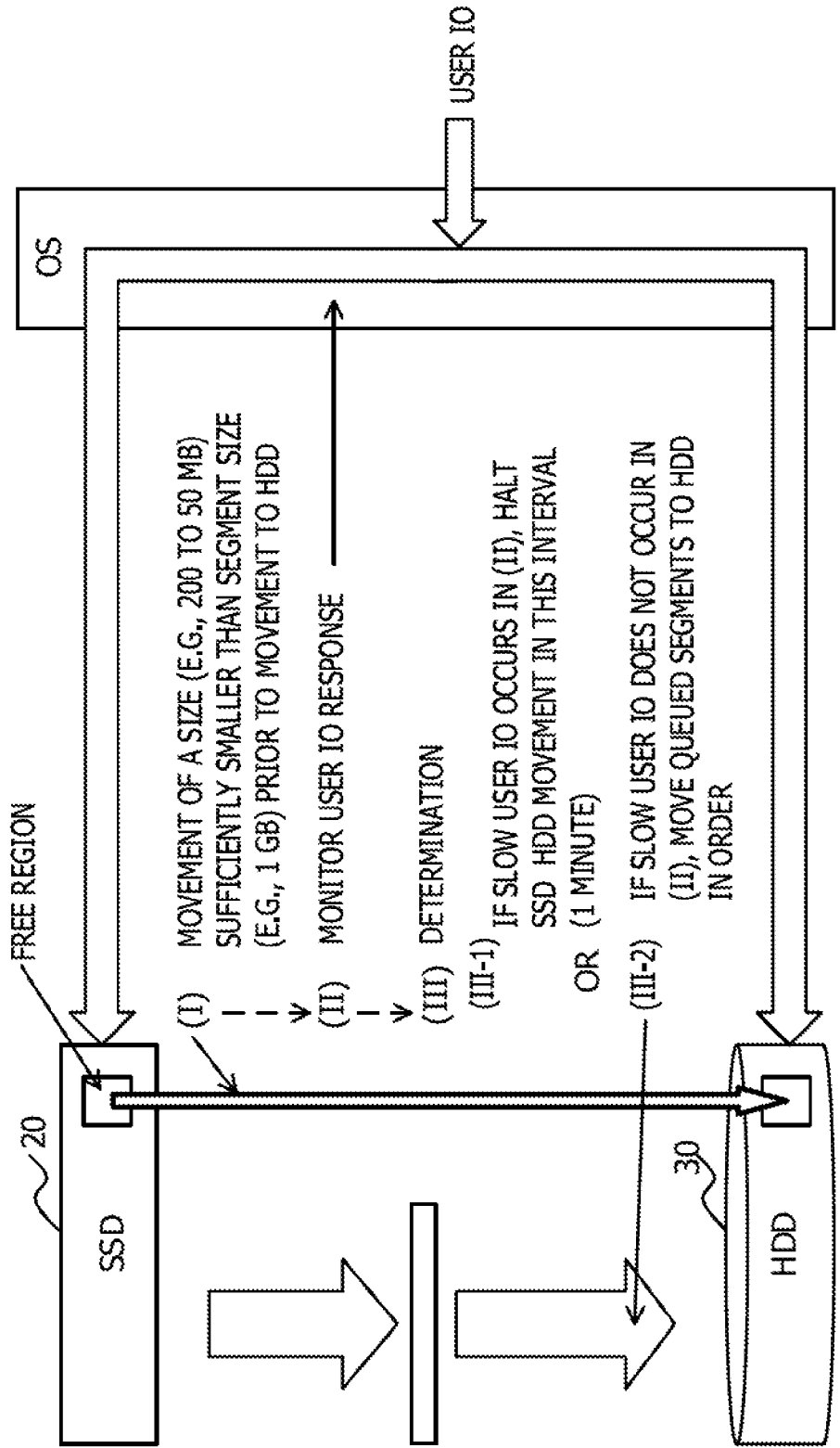
FIG. 9 is a diagram for explaining an example of the processing procedure of observational movement control performed by a movement control unit and an observational processing unit.

Referring to FIG. 9, an example of the processing procedure of the observational movement control performed by the movement control unit 11*e* and the observational processing unit 12*e* will be described. As illustrated by (I) in FIG. 9, in the observational movement control, the movement control unit 11*e* instructs the hierarchy driver 12 (observational processing unit 12*e*) to perform observational movement (refer to (1) in FIG. 12) prior to the movement of a segment from the SSD 20 to the HDD 30.

The processing of (I) may be executed when information (for example, segment ID) regarding the segment selected (instructed) as a movement target to be moved from the SSD 20 to the HDD 30 by the IO analysis is received from the workload analyzing unit 11*c*. At this time, the movement control unit 11*e* stores the information regarding the segment specified in an instruction from the workload analyzing unit 11c in the movement queue 11g (refer to FIG. 1).

The movement queue 11g is a storage region having a FIFO structure that temporarily stores information indicating a segment instructed by the workload analyzing unit 11c to be a movement target to be moved from the SSD 20 to the HDD 30 and is implemented using a memory or the like, which is not illustrated. By queuing the information regarding the segments that are to undergo hierarchical movement in the movement queue 11g, the timing at which hierarchical movement is performed can be adjusted.

As an example, upon receiving from the workload analyzing unit 11c information regarding segments that are to be moved to the HDD 30, the movement control unit 11e stores the information regarding the segments in the movement queue 11g in the order the information is received. Furthermore, the movement control unit 11e instructs the hierarchy driver 12 to perform observational movement even in the case where there is just one piece of information regarding a segment stored in the movement queue 11g.

Figure 12:
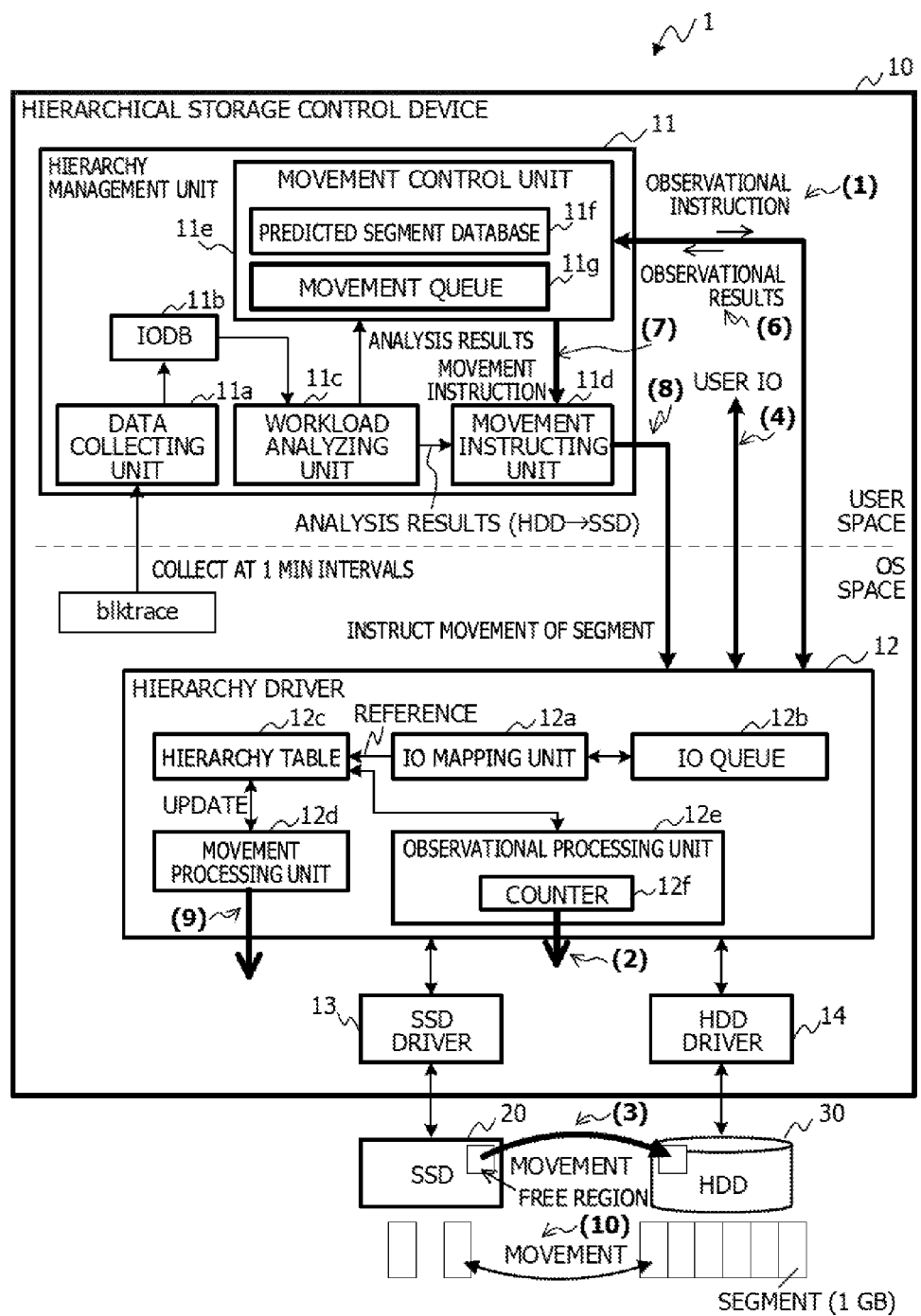
FIG. 12 is a diagram for explaining an example of the processing procedure of observational movement control performed by a movement control unit and an observational processing unit.

The hierarchy driver 12 (observational processing unit 12e) can, for example, instruct kcopyd to perform observational movement between free regions from the SSD 20 to the HDD 30 (refer to (2) in FIG. 12) and cause kcopyd to perform observational movement (refer to (3) in FIG. 12) in accordance with an observational movement instruction from the movement control unit 11e. In the case where the observational processing unit 12e receives information regarding a segment that is a movement target based on IO analysis along with a movement instruction, the observational processing unit 12e may select a region that is part of the segment that is a movement target as the size of observational movement. The region for which observational movement is performed is not limited to that described above and any arbitrary region may be selected.

The observational processing unit 12e is provided with a counter 12f in order to observe information regarding the user IO response performance (refer to FIG. 1). The counter 12f counts the number of times the response time to a user IO during movement of data of the observational movement size exceeds a predetermined threshold.

For example, the observational processing unit 12e performs movement at the observational movement size in response to an observational instruction from the movement control unit 11e. Furthermore, as illustrated by (II) in FIG. 9, the observational processing unit 12e measures the response time to user IO's in a predetermined period, for example, in a period of around several seconds to several tens of seconds, (refer to (4) in FIG. 12) and the number of times the response time exceeds the predetermined threshold is counted by the counter 12f (refer to (5) in FIG. 12). Once the predetermined period is over, the observational processing unit 12e notifies the movement control unit 11e of the count value of the counter 12f (refer to (6) in FIG. 12). Observational movement of a selected region may be repeatedly performed during the predetermined period.

The predetermined threshold may be from several tens of ms to several hundred ms, and for example, may be around 300 ms.

As illustrated by (III) in FIG. 9, upon receiving the count value from the observational processing unit 12e after the predetermined period has elapsed since the observational instruction was issued, the movement control unit 11e determines whether to execute hierarchical movement at the segment size based on the received count value.

For example, in the case where the received count value is a value that does not indicate degradation of the response, for example, 0, the movement control unit 11e determines to perform the processing of hierarchical movement at the segment size since user IO's to which there was a slow response did not occur (refer to (III-2) in FIG. 9). On the other hand, in the case where the received count value is a value that does indicate degradation of the response, for example, a value larger than 0, the movement control unit 11e determines not to perform the processing of hierarchical movement at the segment size in the current interval (period) since user IO's to which there was a slow response did occur (refer to (III-1) in FIG. 9).

In the case where the movement control unit 11e determines to perform the hierarchical movement processing, the movement control unit 11e retrieves and sequentially notifies the movement instructing unit 11d of the information regarding the segments stored in the movement queue 11g and instructs the movement instructing unit 11d to perform hierarchical movement (refer to (7) in FIG. 12). Upon receiving the instruction, the movement instructing unit 11d instructs the hierarchy driver 12 to perform hierarchical movement (refer to (8) in FIG. 12), the movement processing unit 12d instructs, for example, kcopyd to perform transfer (refer to (9) in FIG. 12) and hierarchical movement is performed (refer to (10) in FIG. 12), as described above.

On the other hand, in the case where the movement control unit 11e determines not to perform hierarchical movement processing, the movement control unit 11e stands by until the next period without retrieving information regarding a segment stored in the movement queue 11g (hierarchical movement is halted).

Thus, upon receiving an instruction from the workload analyzing unit 11c to perform hierarchical movement from the SSD 20 to the HDD 30, the movement control unit 11e queues information regarding segments that are to undergo hierarchical movement and causes the observational processing unit 12e to perform movement at a size sufficiently smaller than the segment size to free regions. The movement control unit 11e halts the hierarchical movement in the case where degradation of user IO's is observed and instructs movement of the segments specified by the IO analysis in the case where degradation of user IO's is not observed.

Therefore, it is determined whether to perform hierarchical movement from the SSD 20 to the HDD 30 by detecting the load state of the HDD 30 in real time, and hierarchical movement can be performed at a timing that will not affect the user IO response and degradation of the user IO response can be suppressed.

As described above, the movement control unit 11e is an example of a control unit that issues a movement instruction that instructs second data stored in a region of a second size that is smaller than the first size to be moved from the SSD 20 to the HDD 30 in accordance with the determination of a segment that is to be a movement target in the hierarchical movement processing.

Furthermore, the observational processing unit 12e is an example of an obtaining unit that moves data stored in a region of the second size that is smaller than the first size from the SSD 20 to the HDD 30 in accordance with a movement instruction from the movement control unit 11e and that obtains information regarding the response performance during the movement of the data.

In addition, the movement control unit 11e is an example of a determination unit that determines whether to execute hierarchical movement processing based on the information regarding the response performance obtained by the observational processing unit 12e.

It can easily be imagined that the optimal values of the observational movement size and the predetermined threshold of the counter 12*f* described above will change depending on the devices used in the hierarchical storage system 1 (for example, the SSD 20, the HDD 30, a bus, and other devices) and the workload. Although the observational movement size is set to 50 MB for a segment size of 1 GB and the threshold of the counter 12*f* is set to 300 ms in the configuration described in the embodiment, these parameters may be appropriately changed in accordance with conditions such as the devices used and so forth.

FIG. 10 is a figure (table) that illustrates an example of the relationship between the consumption (GB) of the SSD 20 and the average response time (ms) in the dynamic hierarchical control according to the embodiment (including proactive movement control and observational movement control) for each predetermined threshold. In addition, in FIG. 10, evaluation results for FACEBOOK (registered trademark) FlashCache where an SSD is mounted as a writeback-scheme cache in addition to a HDD are illustrated as a comparative example.

For the evaluation illustrated in FIG. 10, a system having the following configuration is used.

PC . . . central processing unit (CPU): Intel (registered trademark) Xeon (registered trademark) E5-2650Lx2, memory: 32 GB, OS: Cent-OS5.4 (64 bit)

HDD 30 . . . compatible with serial attached small computer storage interface (SCSI) (SAS), 10,000 rpm, 450 GB×4, RAID0 configuration

SSD 20 . . . 240 GB

In addition, the target workload is a read-write ratio of 56:44 and the workload capacity is 293 GB.

In FIG. 10, "SSD consumption" is the maximum consumption of the SSD 20 allocated using the proactive movement control and the observational movement control and the same value is also set for the FlashCache. "User IO threshold" is a predetermined threshold used in the observational movement control.

As illustrated in FIG. 10, it is clear that the average response time in the proactive and observational movement controls is shorter than that of FlashCache when the SSD consumption is 75 GB or more, and, in particular, the average response time for proactive and observational movement controls is as much as 45.9% faster than for FlashCache when the SSD consumption is 99 GB.

Figure 11:
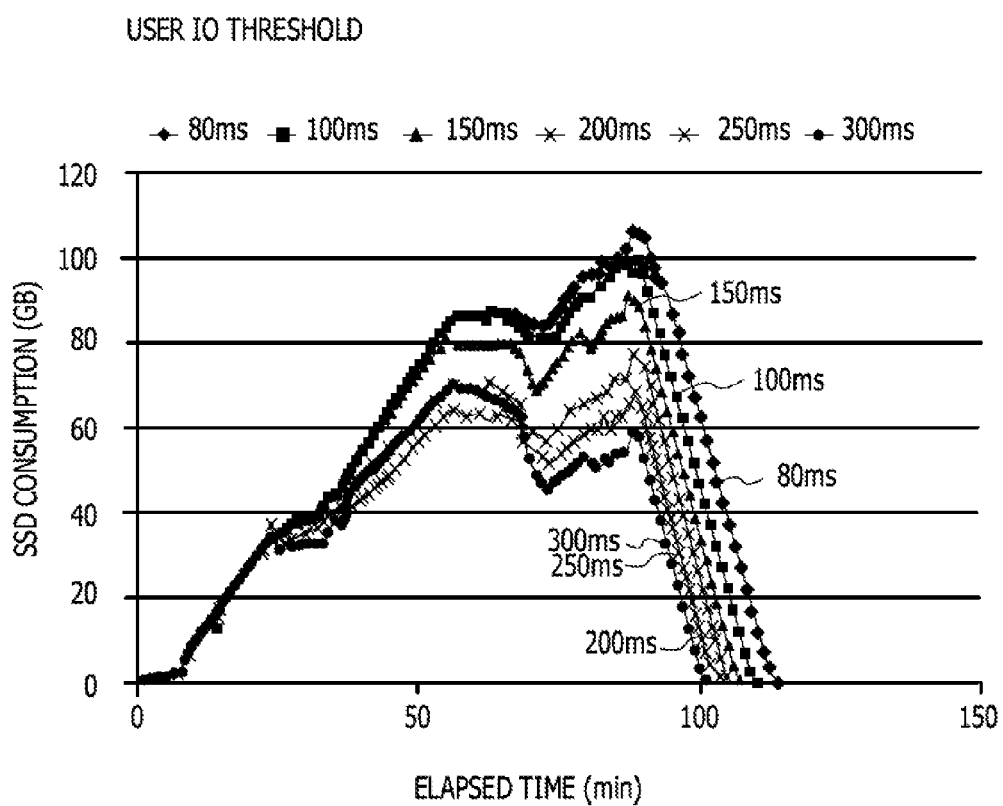
FIG. 11 illustrates examples of SSD consumption for the workloads illustrated in FIG. 10.

FIG. 11 illustrates examples of SSD consumption for the workloads illustrated in FIG. 10. As illustrated in FIG. 11, it is clear that the user IO responses fall below the predetermined thresholds and that the SSD consumption falls to 0 in around 20 minutes in the case where proactive movement control and observational movement control are performed by the movement control unit 11*e*. In addition, in FIG. 11, it is clear that the usage amount of the SSD 20 decreases and the time taken for the usage amount to fall to 0 becomes shorter, the larger the predetermined threshold is.

It is clear from the evaluation results illustrated in FIGS. 10 and 11 that the SSD consumption increases but the response time becomes shorter as the predetermined threshold is made smaller, and that the SSD consumption falls but the response time becomes longer as the predetermined threshold is made larger.

Therefore, the predetermined threshold is preferably set while taking into consideration the trade-off relationship between the capacity of the SSD 20 and the desired response time. Accordingly, the hierarchy management unit 11 and the hierarchy driver 12 may have a function for adjusting parameters such as the observational movement size and the predetermined threshold of the counter 12*f* to optimum values.

As described above, with the hierarchical storage system 1 according to the embodiment, the average user IO response can be improved by around 40% with respect to FlashCache with which caching is implemented.

(1-4) Example Operation of Hierarchical Storage System

Next, an example of the operation of the hierarchical storage system 1 configured as described above will be described while referring to FIGS. 13 to 21.

First, an example of the operation of data collection processing performed by the data collecting unit 11*a* will be described while referring to FIG. 13. The data collecting unit 11*a* is initiated in response to a blktrace command being executed at a predetermined interval (for example 60 seconds) and completed, and executes data collection processing.

Figure 13:
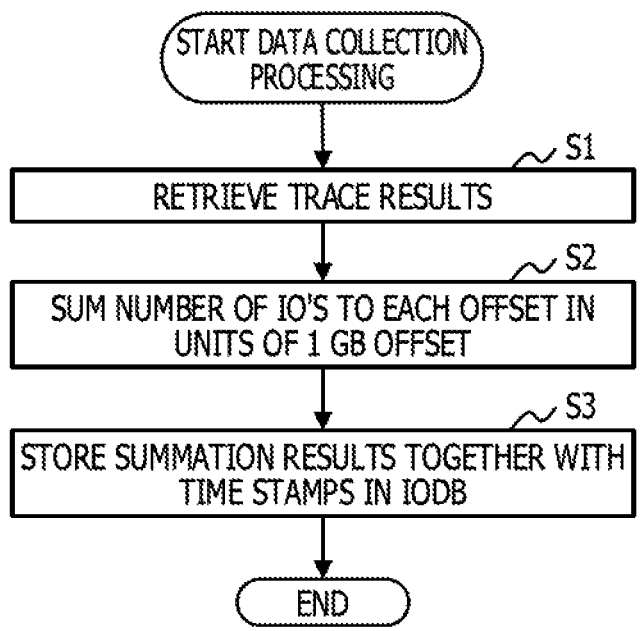
FIG. 13 is a flowchart for explaining an example of the operation of data collection processing performed by a data collecting unit.

As illustrated in FIG. 13, the data collecting unit 11*a* retrieves trace results obtained through the execution of the blktrace command (step S1). Next, the data collecting unit 11*a* sums the number of IO's to each segment in units of a 1 GB offset (offset unit) (step S2), writes the summed numbers of IO's along with time stamps into the IODB 11*b* (step S3), and then the processing for this interval is completed.

Thus, the data collecting unit 11*a* feeds back to the workload analyzing unit 11*c* the effect that the fluidly changing workload has on the user IO's by periodically monitoring the number of IO's to each segment.

Figure 14:
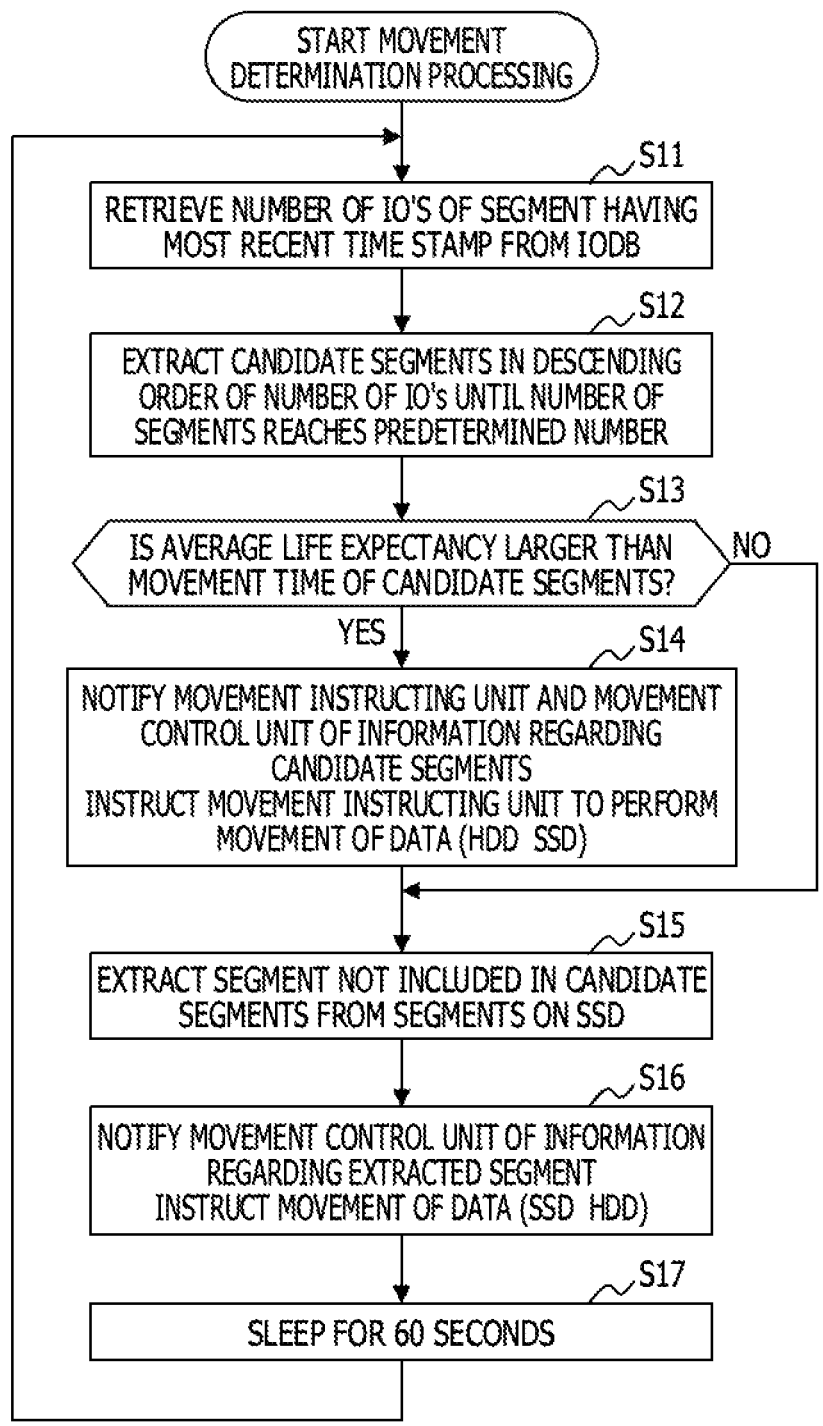
FIG. 14 is a flowchart for explaining an example of the operation of movement determination processing performed by a workload analyzing unit.

Next, an example of the operation of movement determination processing performed by the workload analyzing unit 11*c* will be described while referring to FIG. 14. As illustrated in FIG. 14, the workload analyzing unit 11*c* retrieves the number of IO's for a segment having the most recent time stamp from the IODB 11*b* (step S11), and extracts candidate segments in descending order of the number of IO's until the number of segments reaches a predetermined number (step S12).

Next, the workload analyzing unit 11*c* determines whether an average life expectancy obtained in advance is larger than a movement time for all the candidate segments (step S13).

In the case where the average life expectancy is equal to or less than the movement time (No route of step S13), the processing proceeds to step S15. On the other hand, in the case where the average life expectancy is larger than the movement time (Yes route of step S13), the workload analyzing unit 11*c* notifies the movement instructing unit 11*d* and the movement control unit 11*e* of the information regarding the candidate segments and instructs movement of data (from HDD 30 to SSD 20) (step S14), and the processing then proceeds to step S15.

In step S15, the workload analyzing unit 11*c* extracts a segment that is not included in the candidate segments from among the segments on the SSD 20, for example, a segment for which the number of IO's is comparatively small. The workload analyzing unit 11*c* notifies the movement control unit 11*e* of the information regarding the extracted segment and instructs movement of data (from SSD 20 to HDD 30) (step S16).

Next, the workload analyzing unit 11*c* sleeps for a predetermined period, for example, 60 seconds (step S17), and the processing proceeds to step S11.

The workload analyzing unit 11*c* may extract segments for which the number of IO's or the access concentration ratio (ratio of number of IO's to total number of IO's) is higher than a predetermined threshold in step S12. In addition, in step S15, the workload analyzing unit 11c may extract segments on the SSD 20 for which, for example, the number of IO's or the access concentration ratio is equal to or lower than a predetermined threshold as segments whose data is to be moved to the HDD 30. Furthermore, the workload analyzing unit 11c may select segments that continually satisfy the extraction conditions a predetermined number of times or more as segments to be extracted in steps S12 and S15.

Thus, the workload analyzing unit 11c instructs the movement instructing unit 11d and the movement control unit 11e to move data of segments for which the degree of IO concentration is high from the HDD 30 to the SSD 20, and as a result the user accesses the data of the HDD 30 at high speed.

In addition, the workload analyzing unit 11c instructs the movement control unit 11e to move data of segments for which the degree of IO concentration has become low from the SSD 20 to the HDD 30, and as a result the comparatively high-cost low-capacity SSD 20 is efficiently utilized.

Figure 15:
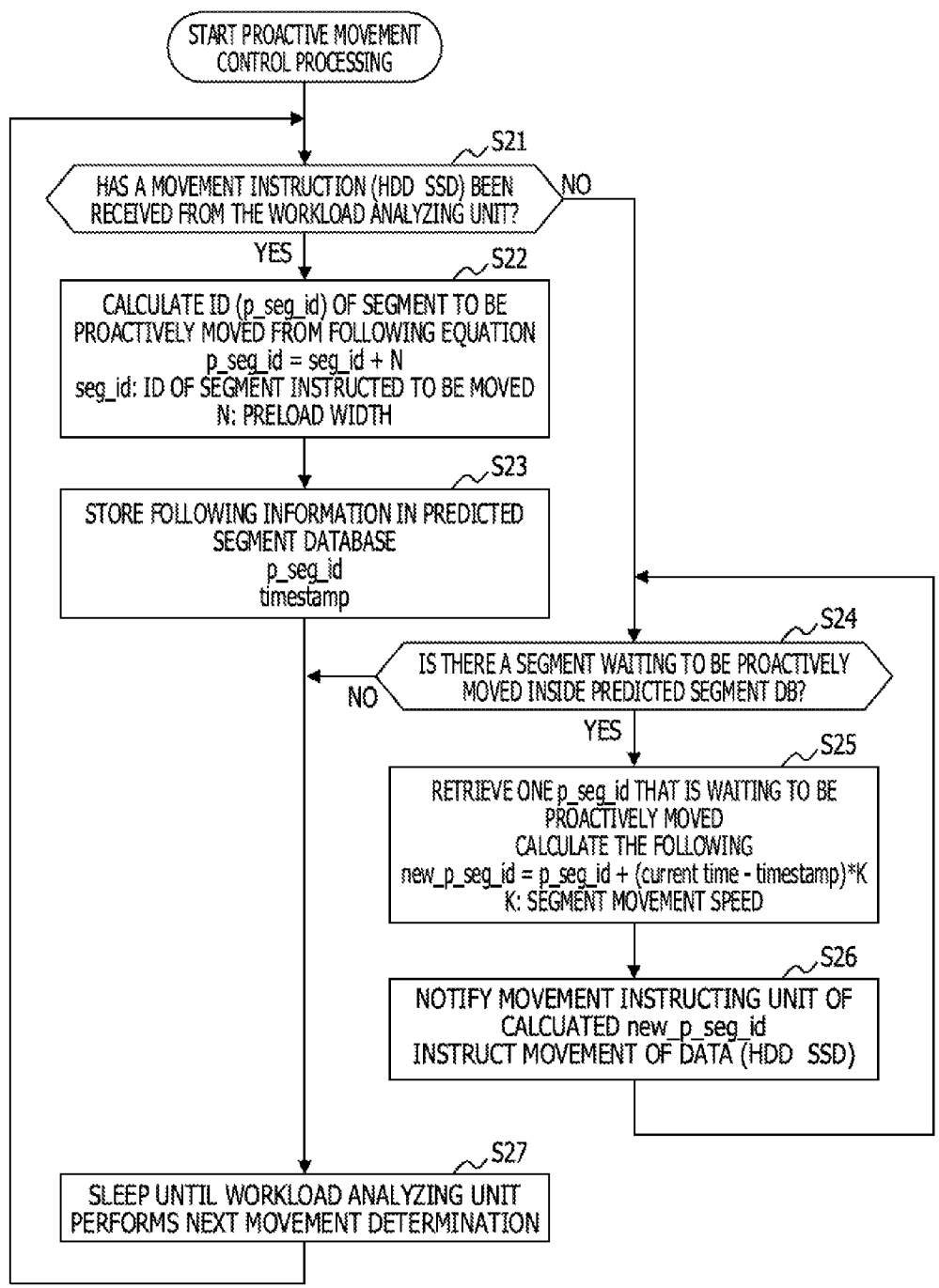
FIG. 15 is a flowchart for explaining an example of the operation of proactive movement control processing performed by a movement control unit.

Next, an example of the operation of the proactive movement control processing performed by the movement control unit 11e will be described while referring to FIG. 15. As illustrated in FIG. 15, the movement control unit 11e determines whether a movement instruction (from HDD 30 to SSD 20) has been received from the workload analyzing unit 11c (step S21) and the processing proceeds to step S22 in the case where a movement instruction has been received (Yes route of step S21).

In step S22, the movement control unit 11e calculates an ID "p_seg_id" of the segment which is to be proactively moved from Equation (1) below.

$$p\_seg\_id = seg\_id + N \quad (1)$$

Here, "seg_id" is the ID of the segment that has been instructed to be moved by the workload analyzing unit 11c and "N" is a width with which proactive movement (preloading from HDD 30 to SSD 20) is to be performed. When "K" is the segment movement speed and a segment where an IO will occur a predicted time "t" minutes later is to be preloaded, "N" is calculated from Equation (2) below.

$$N = K*t \quad (2)$$

Next, the movement control unit 11e stores the calculated ID "p_seg_id of the predicted segment along with the current time "timestamp" in the predicted segment DB 11f (step S23), and then sleeps until the workload analyzing unit 11c performs the next movement determination (step S27), and the processing then proceeds to step S21.

On the other hand, in the case where a movement instruction has not been received from the workload analyzing unit 11c in step S21 (No route of step S21), the movement control unit 11e determines whether there is a segment that is waiting to be proactively moved inside the predicted segment DB 11f (step S24).

In the case where there is no segment that is waiting to be proactively moved (No route of step S24), the processing proceeds to step S27. On the other hand, in the case where there is a segment that is waiting to be proactively moved (Yes route of step S24), the movement control unit 11e retrieves one "p_seg_id" that is waiting to be proactively moved from the predicted segment DB 11f and calculates the following Equation (3) (step S25).

$$new\_p\_seg\_id = p\_seg\_id + (current\ time - timestamp)*K \quad (3)$$

Then, the movement control unit 11e notifies the movement processing unit 12d of the calculated "new_p_seg_id" and instructs movement of data (from HDD 30 to SSD 20) (step S26), and the processing proceeds to step S24.

Thus, the movement control unit 11e calculates a predicted segment that is to be proactively moved based on the information regarding the segment that has been instructed to be moved from the HDD 30 to the SSD 20 and instructs the movement instructing unit 11d to perform segment movement based on the predicted segment at a timing when there is no movement instructed. Therefore, effective hierarchical movement can be performed for segments where IO's will become concentrated in the near future without affecting the operation of the hierarchical movement performed using the analysis performed by the workload analyzing unit 11c.

Figure 16:
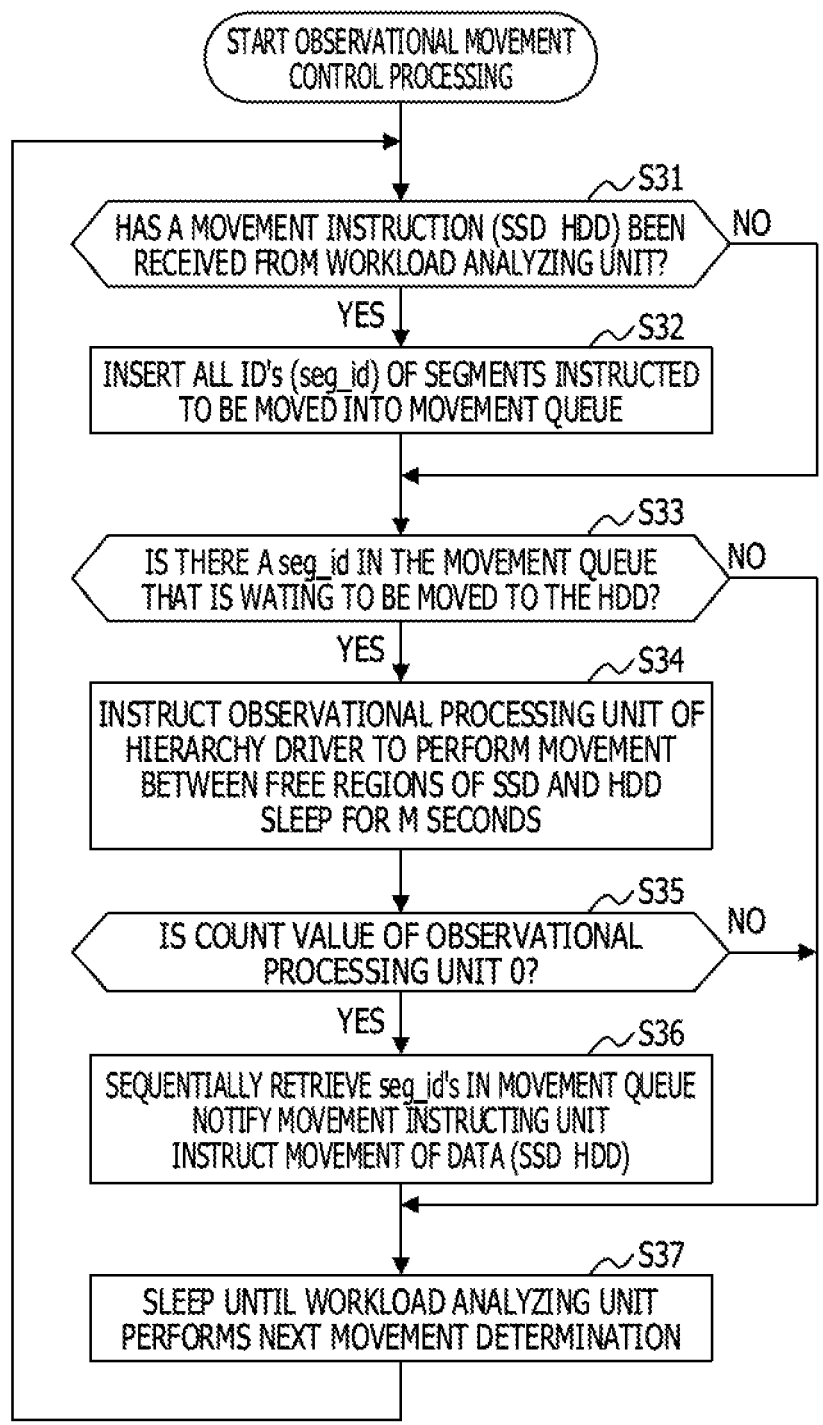
FIG. 16 is a flowchart for explaining an example of the operation of observational movement control processing performed by a movement control unit.

Next, an example of the operation of the observational movement control processing performed by the movement control unit 11e will be described while referring to FIG. 16. As illustrated in FIG. 16, the movement control unit 11e determines whether a movement instruction (from SSD 20 to HDD 30) has been received from the workload analyzing unit 11c (step S31) and the processing proceeds to step S33 in the case where a movement instruction has not been received (No route of step S31).

On the other hand, in the case where a movement instruction has been received (Yes route in step S31), the movement control unit 11e inserts all of the ID's "seg_id" of the segments instructed to be moved by the workload analyzing unit 11c into the movement queue 11g (step S32), and the processing proceeds to step S33.

In step S33, the movement control unit 11e determines whether there is a "seg_id" that is waiting to be moved to the HDD 30 in the movement queue 11g. In the case where there is no "seg_id" waiting to be moved (No route in step S33), the movement control unit 11e sleeps until the workload analyzing unit 11c makes the next movement determination (step S37), and the processing then proceeds to step S31.

In step S33, in the case where there is a "seg_id" that is waiting to be moved (Yes route in step S33), the movement control unit 11e instructs the observational processing unit 12e of the hierarchy driver 12 to perform movement between free regions of the SSD 20 and the HDD 30 and then sleeps for a predetermined period, for example, M seconds (M is a real number of 0 or more) (step S34).

In step S34, the movement control unit 11e may notify the observational processing unit 12e of the information of at least one "seg_id" that is waiting to be moved and instruct observational movement for a region of the observational size in the notified segment. In addition, the movement control unit 11e may convert the offset on the volume of the free region of the SSD 20 into an offset on the HDD 30 and include the converted offset in the instruction for observational movement.

Next, the movement control unit 11e determines whether the count value of the counter 12f notified by the observational processing unit 12e is 0 (step S35). In the case where the count value is not 0 (No route of step S35), the processing proceeds to step S37. On the other hand, in the case where the count value is 0 (Yes route in step S35), the movement control unit 11e sequentially retrieves the "seg_id"'s from inside the movement queue 11g, notifies the movement instructing unit 11d of the retrieved "seg_id"'s and instructs movement of data (from SSD 20 to HDD 30) (step S36), and the processing then proceeds to step S37.

The determination threshold of the count value in step S35 is not limited to 0 and another value may be set in the relationship of the predetermined threshold of the counter 12*f* in the observational processing unit 12*e*.

Thus, the movement control unit 11*e* instructs the observational processing unit 12*e* to perform observational movement of the observational size before movement of a segment from the SSD 20 to the HDD 30 and moves a segment in accordance with information relating to the user IO response performance during the observational movement. Therefore, the operation of hierarchical movement based on the analysis performed by the workload analyzing unit 11*c* can be executed at a timing where is no (little) effect on the user IO response.

Figure 17:
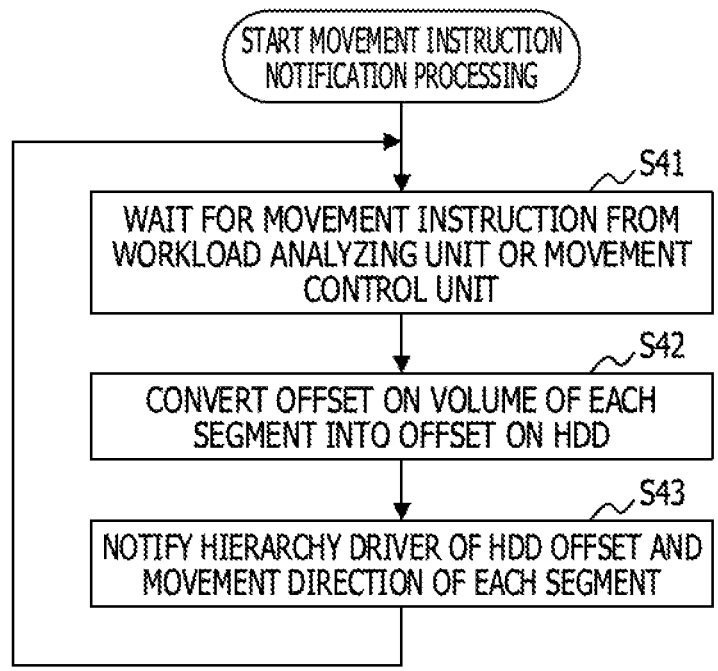
FIG. 17 is a flowchart for explaining an example of the operation of movement instruction notification processing performed by a movement instructing unit.

Next, an example of the operation of movement instruction notification processing performed by the movement instructing unit 11*d* will be described while referring to FIG. 17. As illustrated in FIG. 17, the movement instructing unit 11*d* waits to receive a movement instruction from the workload analyzing unit 11*c* or the movement control unit 11*e* (step S41), and upon receiving a movement instruction, converts the offset on the volume of each segment into an offset on the HDD 30 (step S42).

Then, the movement instructing unit 11*d* notifies the hierarchy driver 12 (movement processing unit 12*d*) of the offset on the HDD 30 and the data movement direction for each segment (step S43), and the processing then proceeds to step S41. The data movement direction that the movement processing unit 12*d* is notified of at this time is a direction from the HDD 30 to the SSD 20 or a direction from the SSD 20 to the HDD 30.

Thus, the movement instructing unit 11*d* converts the volume offset of each segment into an offset on the HDD 30, and as a result the hierarchy driver 12 moves data between the SSD 20 and the HDD 30.

Figure 18:
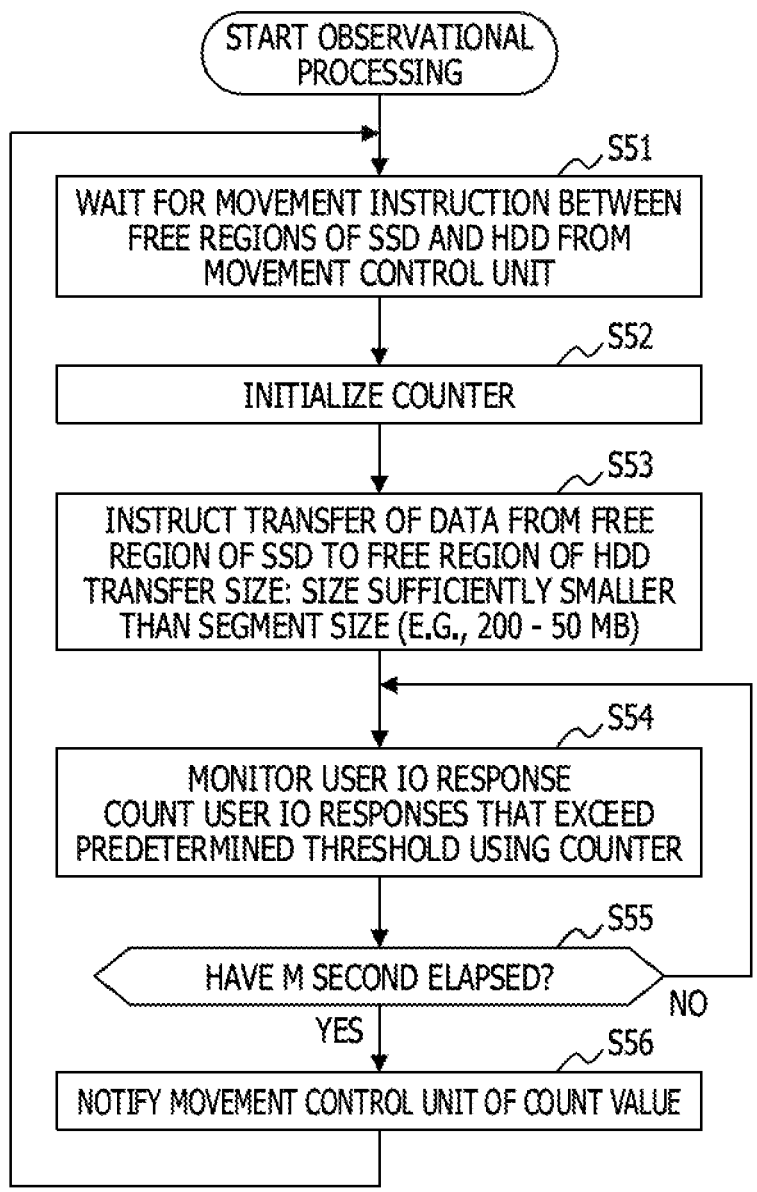
FIG. 18 is a flowchart for explaining an example of the operation of observational processing performed by an observational processing unit.

Next, an example of the operation of the observational processing performed by the observational processing unit 12*e* will be described while referring to FIG. 18. As illustrated in FIG. 18, the observational processing unit 12*e* waits to receive a movement instruction (observational movement instruction) from the movement control unit 11*e* for movement between free regions of the SSD 20 and the HDD 30 (step S51), and upon receiving an observational movement instruction, initializes the counter 12*f* (step S52).

Next, the observational processing unit 12*e* instructs kcopyd to transfer data from a free region of the SSD 20 to a free region of the HDD 30 (step S53). At this time, the observational processing unit 12*e* counts a predetermined period, for example, M seconds. The observational processing unit 12*e* may use information regarding the offset notified by the movement control unit 11*e* in specifying a region that is to be a movement target and may refer to the hierarchy table 12*c*. In addition, the observation size of observational movement is a size that is sufficiently smaller than the segment size and the observation size is on the order of 200 to 50 MB for a segment size of 1 GB in the example of the embodiment.

The observational processing unit 12*e* monitors the user IO response during observational movement, counts user IO responses that exceed a predetermined threshold using the counter 12*f* (step S54) and determines whether M seconds have elapsed (step S55).

In the case where M seconds have not elapsed (No route of step S55), the processing proceeds to step S54. On the other hand, in the case where M seconds have elapsed (Yes route in step S55), the observational processing unit 12*e* notifies the movement control unit 11*e* of the count value (step S56), and then the processing proceeds to step S51.

Thus, the observational processing unit 12*e* is able to observe the user IO response during observational movement in real time and therefore is able to accurately detect the optimal timing at which to perform hierarchical movement (from SSD 20 to HDD 30).

Figure 19:
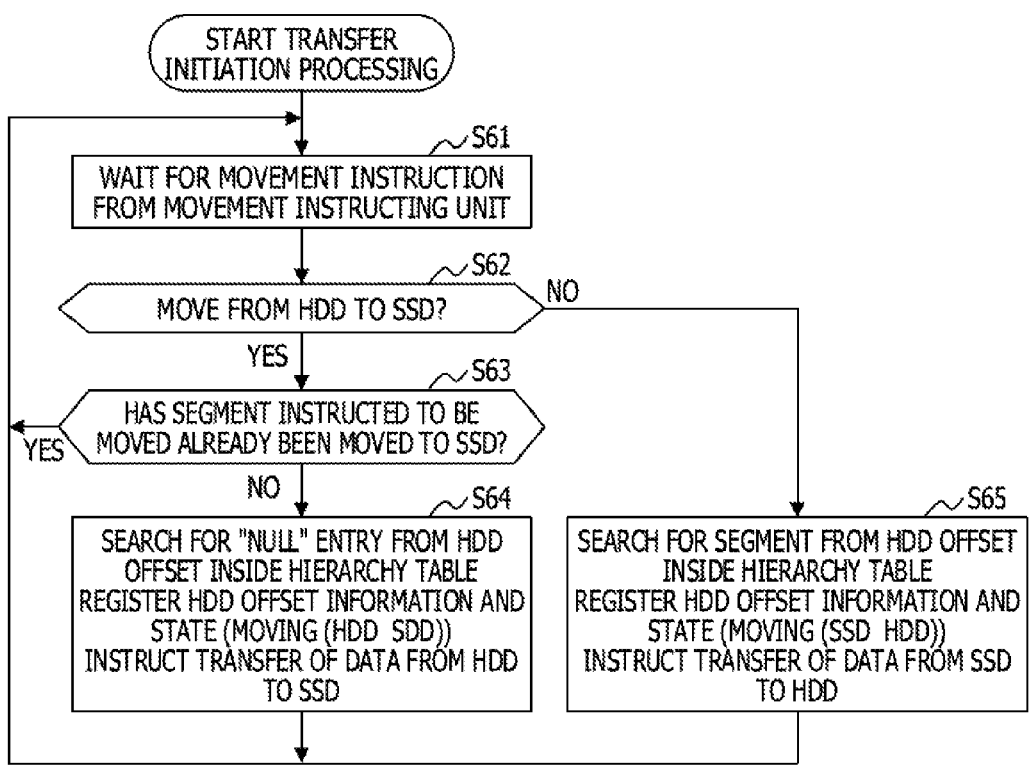
FIG. 19 is a flowchart for explaining an example of the operation of transfer initiation processing performed by a movement processing unit of a hierarchy driver.

Next, an example of the operation of transfer initiation processing performed by the movement processing unit 12*d* of the hierarchy driver 12 will be described while referring to FIG. 19. As illustrated in FIG. 19, the movement processing unit 12*d* waits to receive a movement instruction from the movement instructing unit 11*d* (step S61), and upon receiving a movement instruction, determines whether data is to be moved from the HDD 30 to the SSD 20 (step S62).

In the case where data is to be moved from the HDD 30 to the SSD 20 (Yes route in step S62), the movement processing unit 12*d* determines whether the segment that has been instructed to be moved has already been moved to the SSD 20 (step S63). In the case where it has already been moved (Yes route in step S63), the processing proceeds to step S61.

On the other hand, in the case where it has not already been moved (No route in step S63), the movement processing unit 12*d* searches for a "NULL" entry using the HDD offset inside the hierarchy table 12*c* and registers the HDD offset information and the state. The state registered by the movement processing unit 12*d* at this time is "Moving (HDD to SSD)". Then, the movement processing unit 12*d* issues an instruction for transferring data from the HDD 30 to the SSD 20 to kcopyd (step S64), and the processing then proceeds to step S61.

In step S62, in the case where the movement instruction is not for movement of data from the HDD 30 to the SSD 20 (No route in step S62), the movement processing unit 12*d* searches for a segment using the HDD offset inside the hierarchy table 12*c* and registers the HDD offset information and the state. The state registered by the movement processing unit 12*d* at this time is "Moving (SSD→HDD)". Then, the movement processing unit 12*d* issues an instruction for transferring data from the SSD 20 to the HDD 30 to kcopyd (step S65), and the processing then proceeds to step S61.

Figure 20:
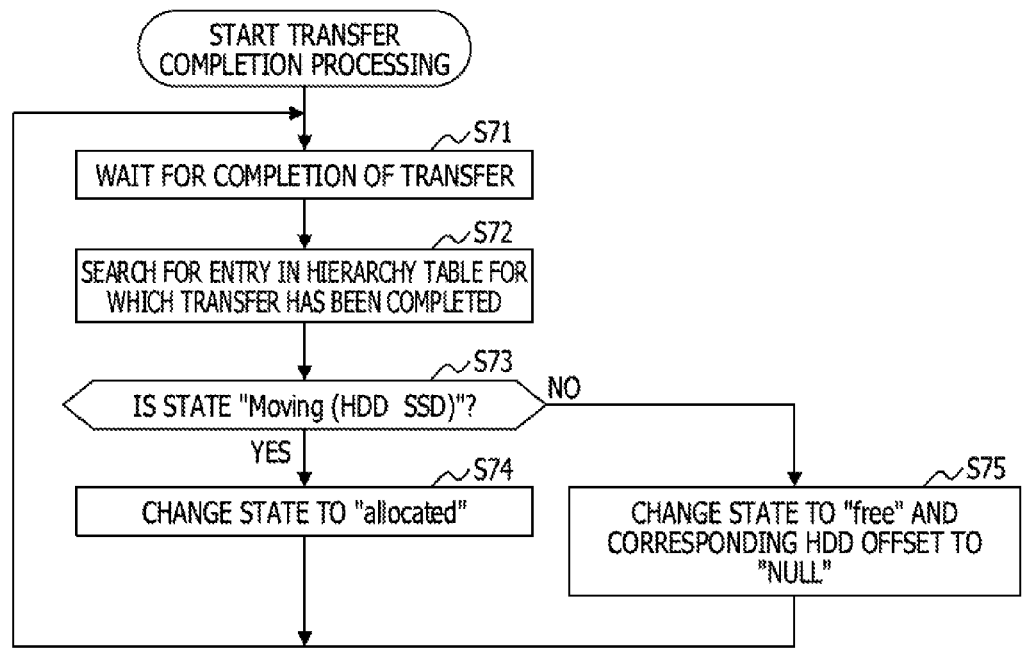
FIG. 20 is a flowchart for explaining an example of the operation of transfer completion processing performed by a movement processing unit of a hierarchy driver.

Next, an example of the operation of transfer completion processing performed by the movement processing unit 12*d* of the hierarchy driver 12 will be described while referring to FIG. 20. As illustrated in FIG. 20, the movement processing unit 12*d* waits for completion of the transfer by kcopyd (step S71), and once the transfer is complete, searches using the HDD offset for an entry in the hierarchy table 12*c* for which the transfer has been completed (step S72).

Then, the movement processing unit 12*d* determines whether the state of the entry found by searching is "Moving (HDD→SSD)" (step S73). In the case where the state is "Moving (HDD→SSD)" (Yes route of step S73), the movement processing unit 12*d* changes the state to "allocated" (step S74), and the processing then proceeds to step S71.

On the other hand, in the case where the state is not "Moving (HDD→SSD)" (is "Moving (SSD→HDD)") (No route of step S73), the movement processing unit 12*d* changes the state to "free" and sets the corresponding HDD offset to "NULL" (step S75), and the processing then proceeds to step S71.

Thus, as a result of the hierarchy driver 12 (movement processing unit 12*d*) transferring data between the SSD 20 and the HDD 30 using the hierarchy table 12*c*, dynamic hierarchical control can be realized by the workload analyzing unit 11*c* and the movement control unit 11*e*.

Figure 21:
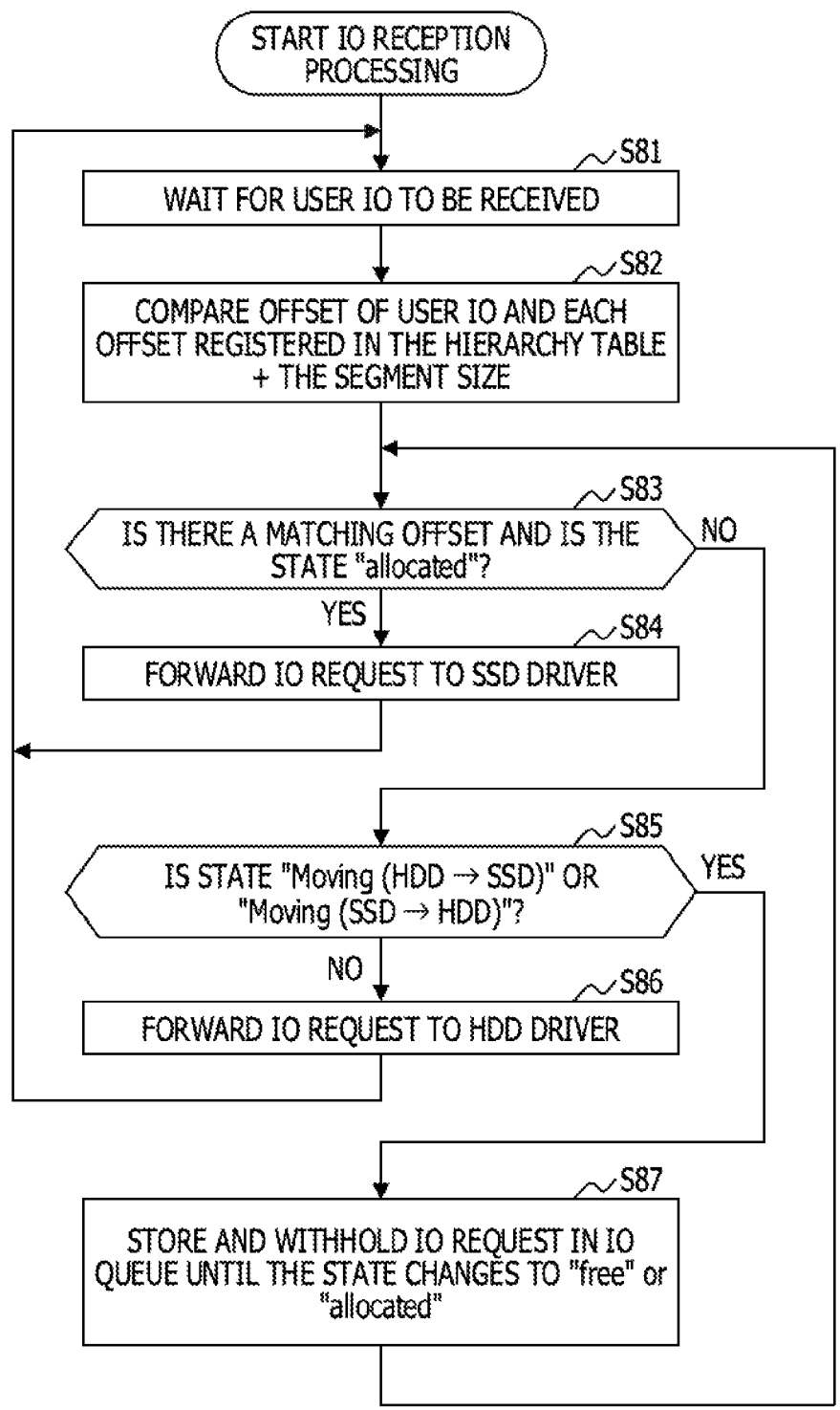
FIG. 21 is a flowchart for explaining an example of the operation of IO reception processing performed by an IO mapping unit.

Finally, an example of the operation of IO reception processing performed by the IO mapping unit 12a will be described while referring to FIG. 21. As illustrated in FIG. 21, the IO mapping unit 12a waits to receive a user IO (step S81), and upon receiving a user 10, compares the offset specified by the user IO and each offset registered in the hierarchy table 12c+the segment size (step S82).

Then, the IO mapping unit 12a determines whether there is a matching offset in the hierarchy table 12c and whether the state is "allocated" based on the comparison results (step S83). In the case where there is a matching offset and the state is "allocated" (Yes route of step S83), the IO mapping unit 12a forwards the IO request to the SSD driver 13 (step S84), and the processing then proceeds to step S81.

On the other hand, in the case where there is no matching offset or the state is not "allocated" (No route in step S83), the IO mapping unit 12a determines whether the state is "Moving (HDD→SSD)" or "Moving (SSD→HDD)" (step S85). In the case where the state is not "Moving (HDD→SSD)" or "Moving (SSD→HDD)" (No route of step S85), the IO mapping unit 12a forwards the IO request to the HDD driver 14 (step S86), and the processing then proceeds to step S81.

In addition, in the case where the state is "Moving (HDD→SSD)" or "Moving (SSD→HDD)" in step S85 (Yes route of step S85), the IO mapping unit 12a stores the IO request in the IO queue 12b until the state changes to "free" or "allocated". That is, the IO mapping unit 12a withholds the IO request until the hierarchical movement of the segment specified in the IO request is complete (step S87). Once the hierarchical movement is complete, the IO mapping unit 12a retrieves the IO request stored in the IO queue 12b, and the processing proceeds to step S83.

(1-5) Example of Hardware Configuration of Hierarchical Storage Control Device

Next, an example of the hardware configuration of the hierarchical storage control device illustrated 10 illustrated in FIG. 1 will be described while referring to FIG. 22. As illustrated in FIG. 22, the hierarchical storage control device 10 includes a CPU 10a, a memory 10b, a storage unit 10c, an interface unit 10d and an input/output unit 10e, for example.

The CPU 10a is an example of a processor that performs various control and arithmetical operations. The CPU 10a may be coupled to each block inside the hierarchical storage control device 10 via a bus so as to be able to communicate therewith. An electronic circuit such as an integrated circuit (IC) such as a micro processing unit (MPU) may be used as the processor instead of the CPU 10a.

The memory 10b is an example of hardware that stores various data and programs. At least one of the IODB 11b, the predicted segment DB 11f, the movement queue 11g and the IO queue 12b illustrated in FIG. 1 may be realized by a storage region in the memory 10b. A volatile memory such as a random access memory (RAM) is an example of the memory 10b.

The storage unit 10c is an example of hardware that stores various data and programs. Examples of the storage unit 10c include various storage devices such as magnetic disk devices such as HDD's, semiconductor drive devices such as SSD's, and non-volatile memories such as flash memories and read only memories (ROM's).

For example, the storage unit 10c may store a storage control program 100 that realizes all or some of the various functions of the hierarchical storage control device 10. In this case, the CPU 10a can realize the functions of the hierarchical storage control device 10 by executing the storage control program 100 stored in the storage unit 10c by loading the storage control program 100 into the memory 10b.

The interface unit 10d is an example of a communication interface that, for example, controls coupling and communication with the SSD 20, the HDD 30, the host device, which is not illustrated, or a workstation of a worker. For example, the interface unit 10d may include an adapter that couples various controller and devices, and a reading unit that reads out data and programs recorded on a recording medium 10f. The controller may include, for example, an I/O controller (IOC) that controls communication with the SSD 20 and the HDD 30, and the adapter may include, for example, a device adapter (DA) that couples the SSD 20 and the HDD 30 and a channel adapter (CA) that couples the host device. The CA may be a CA that conforms to standards of a local area network (LAN), a storage area network (SAN), a fibre channel (FC) or infiniband.

The reading unit may include a coupling terminal or device that can couple or be inserted with the computer-readable recording medium 10f. Examples of the reading unit include an adapter that conforms to the Universal Serial Bus (USB) standard, a drive device that accesses a recording disk, and a card reader that accesses a flash memory such as an SD card. The storage control program 100 may be stored in the recording medium 10f.

The input/output unit 10e can include as least some of input units such as a mouse, a keyboard and an operation button, and output units such as a display. For example, the input unit may be used in work such as registering or changing settings performed by the user or operator, various operations such as selecting (switching) the mode of the system and inputting of data, and the output unit may be used in confirming settings by the operator and outputting various notifications and the like.

The hardware configuration of the hierarchical storage control device 10 described above is an illustrative example. Therefore, the hardware inside the hierarchical storage control device 10 may be appropriately changed (for example, addition or removal of arbitrary blocks), divided, unified in arbitrary combinations, or have a bus added thereto or removed therefrom.

(2) Other Considerations

The technology according to the embodiment described above can be modified and changed in the following ways.

The respective functional blocks of the hierarchical storage control device 10 illustrated in FIG. 1 may be unified in arbitrary combinations or divided.

In addition, although it has been described that the workload analyzing unit 11c and the movement processing unit 12d determine regions that are to be movement targets in units of segments and instruct the movement instructing unit 11d to perform hierarchical movement, the embodiment is not limited to this.

For example, a region that is to be a movement target specified by the workload analyzing unit 11c may be a region obtained by linking together regions in the vicinity of a region with a high load. In this case, the workload analyzing unit 11c may notify the movement control unit 11e or the movement instructing unit 11d of, for example, information indicating a segment ID or a range of segments as information regarding a segment that is to be a movement target.

In the proactive movement control, the movement control unit 11e may predict regions of the same size where IO's will become concentrated in the near future based on information regarding a plurality of segments included in the notified range and the size of the region made up of the range.

An example of the prediction method is a method in which the movement control unit 11e takes an arbitrary segment such as that of the beginning offset, middle offset or final offset of the notified range as a representative segment and the movement control unit 11e calculates a predicted segment for the representative segment. In this case, the movement control unit 11e may obtain a corrected predicted segment range based on the number of segments included in the notified range and may notify the movement instructing unit 11d of this corrected predicted segment range.

Alternatively, the movement control unit 11e may obtain a predicted segment for each of the plurality of segments included in the notified range.

In addition, in the observational movement control, information regarding each of a plurality of segments included in a notified range is stored in the movement queue 11g. Therefore, it is sufficient that the movement control unit 11e instruct the movement instructing unit 11d to perform hierarchical movement by sequentially reading out the segments inside the movement queue 11g as described in the embodiment in the case where no degradation of the IO response is detected.

It is sufficient that the movement instructing unit 11d issue a movement instruction to the hierarchy driver 12 for each of the plurality of segments included in the notified range.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage control device configured to control a storage system including a first storage device and a second storage device, the first storage device and the second storage device including a plurality of regions for storing data, respectively, a data transmission between the first storage device and the second storage device being executed by the region, the storage control device comprising:
    a memory; and
    a processor coupled to the memory and configured to:
        determine a first region included in the plurality of regions of the first storage device as a first transmitting target region, the first region having a first size,
        transmit, from the first storage device to the second storage device, second data stored in the first storage device and having a second size smaller than the first size, and
        based on a response performance of the storage system during the transmitting of the second data, transmit first data stored in the first region from the first storage device to the second storage device.

2. The storage control device according to claim 1, wherein
    the response performance includes a response time to an access to the second storage device during the transmitting of the second data.

3. The storage control device according to claim 1, wherein the processor is further configured to:
    monitor the response performance during the transmitting of the second data, and
    determine whether to execute transmitting of the first data based on the monitored response performance.

4. The storage control device according to claim 3, wherein the processor is further configured to determine not to execute the transmitting of the first data when the response performance is less than a certain value.

5. The storage control device according to claim 3, wherein the processor is further configured to:
    count a number of times the response time during the transmitting of the second data exceeds a first threshold value, and
    determine whether to execute the transmitting of the first data based on the counted number of times.

6. The storage control device according to claim 3, wherein the processor is further configured to:
    store information regarding the first transmitting target region in a queue,
    issue a transmitting instruction instructing an execution of the transmitting of the second data when the information regarding the first transmitting target region is stored in the queue,
    retrieve the information regarding the first transmitting target region from the queue when the processor determines to execute the transmitting of the first data based on the response performance, and
    execute the transmitting of the first data.

7. The storage control device according to claim 3, wherein the processor is further configured to:
    determine a second region included in the plurality of regions of the second storage device as a second transmitting target region from the second storage device to the first storage device based on a number of accesses to the third region, and
    transmit, from the second storage device to the first storage device, third data stored in the second region.

8. The storage control device according to claim 7, wherein the processor is further configured to:
    predict a third region included in the plurality of regions of the second storage device where the number of the accesses is increasing, and
    transmit, from the second storage device to the first storage device, third data stored in the fourth region.

9. The storage control device according to claim 1, wherein
    the plurality of regions of the first storage device are segments obtained by dividing a storage volume of the first storage device into portions of a predetermined size.

10. A storage system including a first storage device and a second storage device, the first storage device including a plurality of regions for storing data, respectively, a data transmission between the first storage device and the second storage device being executed by the region, the storage system comprising:
    a storage control device including a memory and a processor coupled to the memory and configured to:
        determine a first region included in the plurality of regions of the first storage device as a first transmitting target region, the first region having a first size,
        transmit, from the first storage device to the second storage device, second data stored in the first storage device and having a second size smaller than the first size, and based on a response performance of the storage system during the transmitting of the second data, transmit first data stored in the first region from the first storage device to the second storage device.

11. The storage system according to claim 10, wherein the response performance includes a response time to an access to the second storage device during the transmitting of the second data.

12. The storage system according to claim 10, wherein the processor is further configured to:
monitor the response performance during the transmitting of the second data, and
determine whether to execute transmitting of the first data based on the monitored response performance.

13. The storage system according to claim 12, wherein the processor is further configured to determine not to execute the transmitting of the first data when the response performance is less than a certain value.

14. The storage system according to claim 12, wherein the processor is further configured to:
count a number of times the response time during the transmitting of the second data exceeds a first threshold value, and
determine whether to execute the transmitting of the first data based on the counted number of times.

15. The storage system according to claim 10, wherein the plurality of regions of the first storage device are segments obtained by dividing a storage volume of the first storage device into portions of a predetermined size.

16. A method of controlling a storage system, the storage system including a first storage device and a second storage device, the first storage device including a plurality of regions for storing data, respectively, a data transmission between the first storage device and the second storage device being executed by the region, the method comprising:
determining a first region included in the plurality of regions of the first storage device as a first transmitting target region, the first region having a first size;
transmitting, from the first storage device to the second storage device, second data in the first storage device and having a second size smaller than the first size; and
based on a response performance of the storage system during the transmitting of the second data, transmitting first data stored in the first region from the first storage device to the second storage device.

17. The method according to claim 16, wherein the response performance includes a response time to an access to the second storage device during the transmitting of the second data.

18. The method according to claim 16, further comprising:
monitoring the response performance during the transmitting of the second data; and
determining whether to execute transmitting of the first data based on the monitored response performance.

19. The method according to claim 18, wherein in the determining whether to execute transmitting of the first data, determining not to execute the transmitting of the first data when the response performance is less than a certain value.

20. The method according to claim 16, wherein the plurality of regions of the first storage device are segments obtained by dividing a storage volume of the first storage device into portions of a predetermined size.

* * * * *